US011743808B2

(12) United States Patent
Kim et al.

(10) Patent No.: US 11,743,808 B2
(45) Date of Patent: Aug. 29, 2023

(54) USER EQUIPMENT (UE) TRIGGERED EDGE COMPUTING APPLICATION CONTEXT RELOCATION

(71) Applicant: QUALCOMM Incorporated, San Diego, CA (US)

(72) Inventors: Sunghoon Kim, Seoul (KR); Edward Robert Hall, Bristol (GB); Alan Soloway, Erie, CO (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 17/370,840

(22) Filed: Jul. 8, 2021

(65) Prior Publication Data

US 2022/0015018 A1 Jan. 13, 2022

Related U.S. Application Data

(60) Provisional application No. 63/051,151, filed on Jul. 13, 2020.

(51) Int. Cl.
*H04W 48/16* (2009.01)
*H04W 76/38* (2018.01)
*H04W 48/08* (2009.01)

(52) U.S. Cl.
CPC .......... *H04W 48/16* (2013.01); *H04W 48/08* (2013.01); *H04W 76/38* (2018.02)

(58) Field of Classification Search
None
See application file for complete search history.

(56) References Cited

U.S. PATENT DOCUMENTS

| | | | |
|---|---|---|---|
| 2021/0307089 A1* | 9/2021 | Kim | H04W 76/11 |
| 2021/0314391 A1* | 10/2021 | Lee | H04L 67/51 |
| 2021/0352156 A1* | 11/2021 | Kim | H04L 67/51 |
| 2022/0094764 A1* | 3/2022 | Kim | H04W 4/18 |
| 2022/0330128 A1* | 10/2022 | Kim | H04W 88/18 |
| 2022/0338113 A1* | 10/2022 | Gupta | H04W 48/18 |
| 2023/0053805 A1* | 2/2023 | Kim | H04W 60/00 |

* cited by examiner

*Primary Examiner* — German Viana Di Prisco
(74) *Attorney, Agent, or Firm* — Norton Rose Fulbright LLP

(57) ABSTRACT

Systems and methods for user equipment (UE) triggered edge computing application context relocation in an edge computing application architecture are described. For example, in facilitating relocation of an application context from a source edge application server (S-EAS) served by a source edge enabler server (S-EES) to a target EAS (T-EAS) served by a target EES (T-EES), S-EES centric and/or T-EES centric UE triggered application context relocation procedures may be implemented. In accordance with S-EES centric and/or T-EES centric UE triggered application context relocation procedures of some examples, a UE may take primary responsibility with respect to the application context transfer. Other aspects and features are also claimed and described.

30 Claims, 10 Drawing Sheets

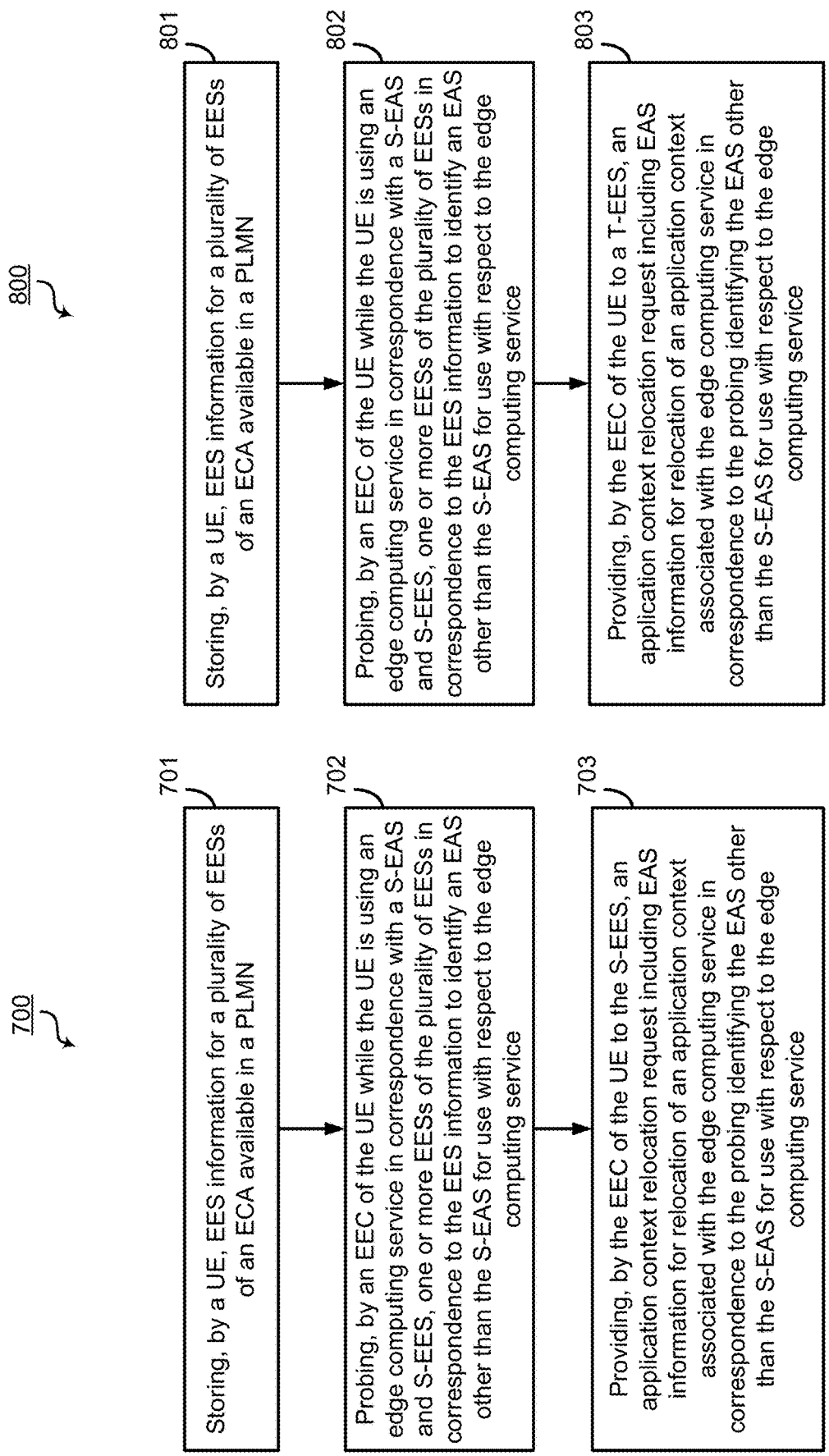

USER EQUIPMENT (UE) TRIGGERED EDGE COMPUTING APPLICATION CONTEXT RELOCATION

CROSS-REFERENCE TO RELATED APPLICATIONS

This application claims the benefit of U.S. Provisional Patent Application No. 63/051,151, entitled, "USER EQUIPMENT (UE) TRIGGERED EDGE COMPUTING APPLICATION CONTEXT RELOCATION," filed on Jul. 13, 2020, the disclosure of which is hereby incorporated by reference herein in its entirety as if fully set forth below and for all applicable purposes.

TECHNICAL FIELD

Aspects of the present disclosure relate generally to wireless communication systems, and more particularly, to edge computing implemented with respect to wireless communication systems. Certain embodiments of the technology discussed below can enable and provide user equipment (UE) triggered edge computing application context relocation in an edge computing application architecture.

Introduction

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE.

An application architecture for edge computing may be implemented for enabling applications to be hosted on the edge of a wireless network. For example, base stations of the wireless network may communicate with one or more gateway functions located close to or integrated with one or more edge servers. UEs may reduce cost and power by offloading latency driven or computation intensive tasks (e.g., various virtual reality (VR), augmented reality (AR), extended reality (XR), etc. processing involving appreciable processing resource utilization) to edge servers located near the network edge. Processing of offloaded applications closer to a UE results in improved application performance and a reduction in network congestion.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include storing, by a user equipment (UE), edge enabler server (EES) information for a plurality of EESes of an edge computing architecture (ECA) available in a public land mobile network (PLMN). The method may also include probing, by an edge enabler client (EEC) of the UE while the UE is using an edge computing service in correspondence with a source edge application server (S-EAS) and source EES (S-EES), one or more EESes of the plurality of EESes in correspondence to the EES information to identify an EAS other than the S-EAS for use with respect to the edge computing service. Further, the method may include providing, by the EEC of the UE to the S-EES, an application context relocation request including EAS information for relocation of an application context associated with the edge computing service in correspondence to the probing identifying the EAS other than the S-EAS for use with respect to the edge computing service.

In an additional aspect of the disclosure, an apparatus configured for wireless communication is provided. The apparatus may include means for storing, by a UE, EES information for a plurality of EESes of an ECA available in a PLMN. The apparatus may also include means for probing, by an EEC of the UE while the UE is using an edge computing service in correspondence with a S-EAS and S-EES, one or more EESes of the plurality of EESes in correspondence to the EES information to identify an EAS other than the S-EAS for use with respect to the edge computing service. Further, the apparatus may include means for providing, by the EEC of the UE to the S-EES, an application context relocation request including EAS information for relocation of an application context associated with the edge computing service in correspondence to probing identifying the EAS other than the S-EAS for use with respect to the edge computing service In an additional aspect of the disclosure, a non-transitory computer-readable medium having program code recorded thereon for wireless communication is provided. The program code may include code to store, by a UE, EES information for a plurality of EESes of an ECA available in a PLMN. The program code may also include code to probe, by an EEC of the UE while the UE is using an edge computing service in correspondence with a S-EAS and S-EES, one or more EESes of the plurality of EESes in correspondence to the EES information to identify an EAS other than the S-EAS for use with respect to the edge computing service. Further, the program code may include code to provide, by the EEC of the UE to the S-EES, an application context relocation request including EAS information for relocation of an application context associated with the edge computing service in correspondence to probing identifying the EAS other than the S-EAS for use with respect to the edge computing service.

In an additional aspect of the disclosure, an apparatus configured for wireless communication is provided. The apparatus includes at least one processor, and a memory coupled to the processor. The processor may be configured to store, by a UE, EES information for a plurality of EESes of an ECA available in a PLMN. The processor may also be configured to probe, by an EEC of the UE while the UE is using an edge computing service in correspondence with a S-EAS and S-EES, one or more EESes of the plurality of EESes in correspondence to the EES information to identify an EAS other than the S-EAS for use with respect to the edge computing service. Further, the processor may be configured to provide, by the EEC of the UE to the S-EES, an application context relocation request including EAS information for relocation of an application context associated with the edge computing service in correspondence to probing identifying the EAS other than the S-EAS for use with respect to the edge computing service.

In accordance with aspects of the disclosure, the foregoing systems, methods, and apparatuses may be implemented in combination with one or more additional features, such as the following features whether alone or in combination. For example, the above systems, methods, and apparatuses may include the EAS information being configured to enable the S-EES to identify application context information for relocating the application context from the S-EAS in use by the EEC to a target EAS (T-EAS) associated with a target EES (T-EES). The above systems, methods, and apparatuses may include performing, by the EEC, a general service provisioning procedure prior to runtime of edge computing applications, wherein the EES information for the plurality of EESes is stored as part of the general service provisioning procedure. The above systems, methods, and apparatuses may include the general service provisioning procedure being performed at a time of UE power-up, or upon the UE joining the PLMN. The above systems, methods, and apparatuses may include obtaining, by the EEC from one or more edge data network configuration servers (ECSes) of the ECA, the EES information for the plurality of EESes, wherein the EES information includes information regarding one or more EESes in communication with a respective ECS that are associated with an EAS suitable for providing one or more edge computing service with respect to the UE. The above systems, methods, and apparatuses may include performing, by the EEC, an EAS discovery procedure at an initial edge computing application runtime; selecting, by the EEC, the S-EAS in correspondence to the EAS discovery procedure; and using, by the UE, the edge computing service as provided by the S-EAS. The above systems, methods, and apparatuses may include determining, by the EEC while the UE is using the edge computing service in correspondence with the S-EAS and S-EES, to perform the probing of the one or more EESes of the plurality of EESes. The above systems, methods, and apparatuses may include the determining to perform probing of the one or more EESes of the plurality of EESes being based on or otherwise performed in association with one or more of expiration of an in-service discovery timer, observation of a degraded indicator of key performance indicators (KPIs) with the S-EAS, detection of UE mobility, change of requirements by an application client of the UE using the edge computing service, or a request by the application client. The above systems, methods, and apparatuses may include the probing of the one or more EESes of the plurality of EESes being performed as part of a procedure asking for service with respective EESes of the plurality of EESes. The above systems, methods, and apparatuses may include the procedure asking for service with respective EESes of the plurality of EESes including an EAS discovery procedure. The above systems, methods, and apparatuses may include obtaining, by the EEC, offer responses from the respective EESes including key performance indicators (KPIs) information for EASes served by the respective EESes. The above systems, methods, and apparatuses may include selecting, by the EEC while the UE is using the edge computing service in correspondence with the S-EAS and S-EES, the T-EES and a T-EAS for relocation of the application context in correspondence to the probing. The above systems, methods, and apparatuses may include the EEC selecting the T-EES for relocation of the application context in correspondence to the probing indicating that the T-EAS served by the T-EES is a best EAS of EASes served by the probed EESes. The above systems, methods, and apparatuses may include the T-EAS being identified as the best EAS of the probed EASes corresponding to comparison of KPIs information obtained by the probing indicating that the T-EAS has best KPIs of probed EASes. The above systems, methods, and apparatuses may include the T-EES and the T-EAS being selected for relocation of the application context in correspondence to the probing indicating that the T-EES serving the T-EAS has a lowest round trip time (RTT) of probed EESes. The above systems, methods, and apparatuses may include the application context relocation request being configured to initiate an application context relocation procedure to be performed by the S-EES. The above systems, methods, and apparatuses may include receiving, by the EEC from the S-EES, information regarding completion of application context relocation. The above systems, methods, and apparatuses may include performing, by the EEC with the T-EES, a registration process or an application context relocation complete notification process establishing an association in which the EEC is served by the T-EES and using a T-EAS associated with the T-EES.

In one aspect of the disclosure, a method of wireless communication is provided. The method may include storing, by UE, EES information for a plurality of EESes of an ECA available in a PLMN. The method may also include probing, by an EEC of the UE while the UE is using an edge computing service in correspondence with a S-EAS and S-EES, one or more EESes of the plurality of EESes in correspondence to the EES information to identify an EAS other than the S-EAS for use with respect to the edge computing service. Further, the method may include providing, by the EEC of the UE to a T-EES, an application context relocation request including EAS information for relocation of an application context associated with the edge computing service in correspondence to the probing identifying the EAS other than the S-EAS for use with respect to the edge computing service.

In an additional aspect of the disclosure, an apparatus configured for wireless communication is provided. The apparatus may include means for storing, by a UE, EES information for a plurality of EESes of an ECA available in a PLMN. The apparatus may also include means for probing, by an EEC of the UE while the UE is using an edge computing service in correspondence with a S-EAS and S-EES, one or more EESes of the plurality of EESes in correspondence to the EES information to identify an EAS other than the S-EAS for use with respect to the edge computing service. Further, the apparatus may include means for providing, by the EEC of the UE to a T-EES, an application context relocation request including EAS information for relocation of an application context associated with the edge computing service in correspondence to probing identifying the EAS other than the S-EAS for use with respect to the edge computing service.

In an additional aspect of the disclosure, a non-transitory computer-readable medium having program code recorded thereon for wireless communication is provided. The program code may include code to store, by a UE, EES information for a plurality of EESes of an ECA available in a PLMN. The program code may also include code to probe, by an EEC of the UE while the UE is using an edge computing service in correspondence with a S-EAS and S-EES, one or more EESes of the plurality of EESes in correspondence to the EES information to identify an EAS other than the S-EAS for use with respect to the edge computing service. Further, the program code may include code to provide, by the EEC of the UE to a T-EES, an application context relocation request including EAS information for relocation of an application context associated with the edge computing service in correspondence to probing identifying the EAS other than the S-EAS for use with respect to the edge computing service.

In an additional aspect of the disclosure, an apparatus configured for wireless communication is provided. The apparatus includes at least one processor, and a memory coupled to the processor. The processor may be configured to store, by a UE, EES information for a plurality of EESes of an ECA available in a PLMN. The processor may also be configured to probe, by an EEC of the UE while the UE is using an edge computing service in correspondence with a S-EAS and S-EES, one or more EESes of the plurality of EESes in correspondence to the EES information to identify an EAS other than the S-EAS for use with respect to the edge computing service. Further, the processor may be configured to provide, by the EEC of the UE to a T-EES, an application context relocation request including EAS information for relocation of an application context associated with the edge computing service in correspondence to probing identifying the EAS other than the S-EAS for use with respect to the edge computing service.

In accordance with aspects of the disclosure, the foregoing systems, methods, and apparatuses may be implemented in combination with one or more additional features, such as the following features whether alone or in combination. For example, the above systems, methods, and apparatuses may include the EAS information being configured to enable the T-EES to identify application context information for relocating the application context from the S-EAS in use by the EEC to a target EAS (T-EAS) associated with the T-EES. The above systems, methods, and apparatuses may include performing, by the EEC, a general service provisioning procedure prior to runtime of edge computing applications, wherein the EES information for the plurality of EESes is stored as part of the general service provisioning procedure. The above systems, methods, and apparatuses may include the general service provisioning procedure being performed at a time of UE power-up, or upon the UE joining the PLMN. The above systems, methods, and apparatuses may include obtaining, by the EEC from one or more ECSes of the ECA, the EES information for the plurality of EESes, wherein the EES information includes information regarding one or more EESes in communication with a respective ECS that are associated with an EAS suitable for providing one or more edge computing service with respect to the UE. The above systems, methods, and apparatuses may include performing, by the EEC, an EAS discovery procedure at an initial edge computing application runtime; selecting, by the EEC the S-EAS in correspondence to the EAS discovery procedure; and using, by the UE, the edge computing service as provided by the S-EAS. The above systems, methods, and apparatuses may include determining, by the EEC while the UE is using the edge computing service in correspondence with the S-EAS and S-EES, to perform the probing of the one or more EESes of the plurality of EESes. The above systems, methods, and apparatuses may include the determining to perform probing of the one or more EESes of the plurality of EESes being based on or otherwise performed in association with one or more of expiration of an in-service discovery timer, observation of a degraded indicator of KPIs with the S-EAS, detection of UE mobility, change of requirements by an application client of the UE using the edge computing service, or a request by the application client. The above systems, methods, and apparatuses may include the probing of the one or more EESes of the plurality of EESes being performed as part of a procedure asking for service with respective EESes of the plurality of EESes. The above systems, methods, and apparatuses may include the procedure asking for service with respective EESes of the plurality of EESes including an EAS discovery procedure. The above systems, methods, and apparatuses may include obtaining, by the EEC, offer responses from the respective EESes including KPIs information for EASes served by the respective EESes. The above systems, methods, and apparatuses may include selecting, by the EEC while the UE is using the edge computing service in correspondence with the S-EAS and S-EES, the T-EES and a T-EAS for relocation of the application context in correspondence to the probing. The above systems, methods, and apparatuses may include the EEC selecting the T-EES for relocation of the application context in correspondence to the probing indicating that the T-EAS served by the T-EES is a best EAS of EASes served by the probed EESes. The above systems, methods, and apparatuses may include the T-EAS being identified as the best EAS of the probed EASes corresponding to comparison of KPIs information obtained by the probing indicating that the T-EAS has best KPIs of probed EASes. The above systems, methods, and apparatuses may include the T-EES and the T-EAS being selected for relocation of the application context in correspondence to the probing indicating that the T-EES serving the T-EAS has a lowest RTT of probed EESes. The above systems, methods, and apparatuses may include the application context relocation request being configured to initiate an application context relocation procedure to be performed by the T-EES. The above systems, methods, and apparatuses may include receiving, by the EEC from the T-EES, information regarding completion of application context relocation. The above systems, methods, and apparatuses may include performing, by the EEC with the T-EES, a registration process or an application context relocation complete notification process establishing an association in which the EEC is served by the T-EES and using a T-EAS associated with the T-EES.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar compo

FIGS. 5 and 7 are flow diagrams illustrating operation according to example user equipment (UE) triggered application context relocation procedures implementing source edge enabler server (S-EES) centric protocols.

FIGS. 6 and 8 are flow diagrams illustrating operation according to example UE triggered application context relocation procedures implementing target EES (T-EES) centric protocols.

DETAILED DESCRIPTION

Figure 1:
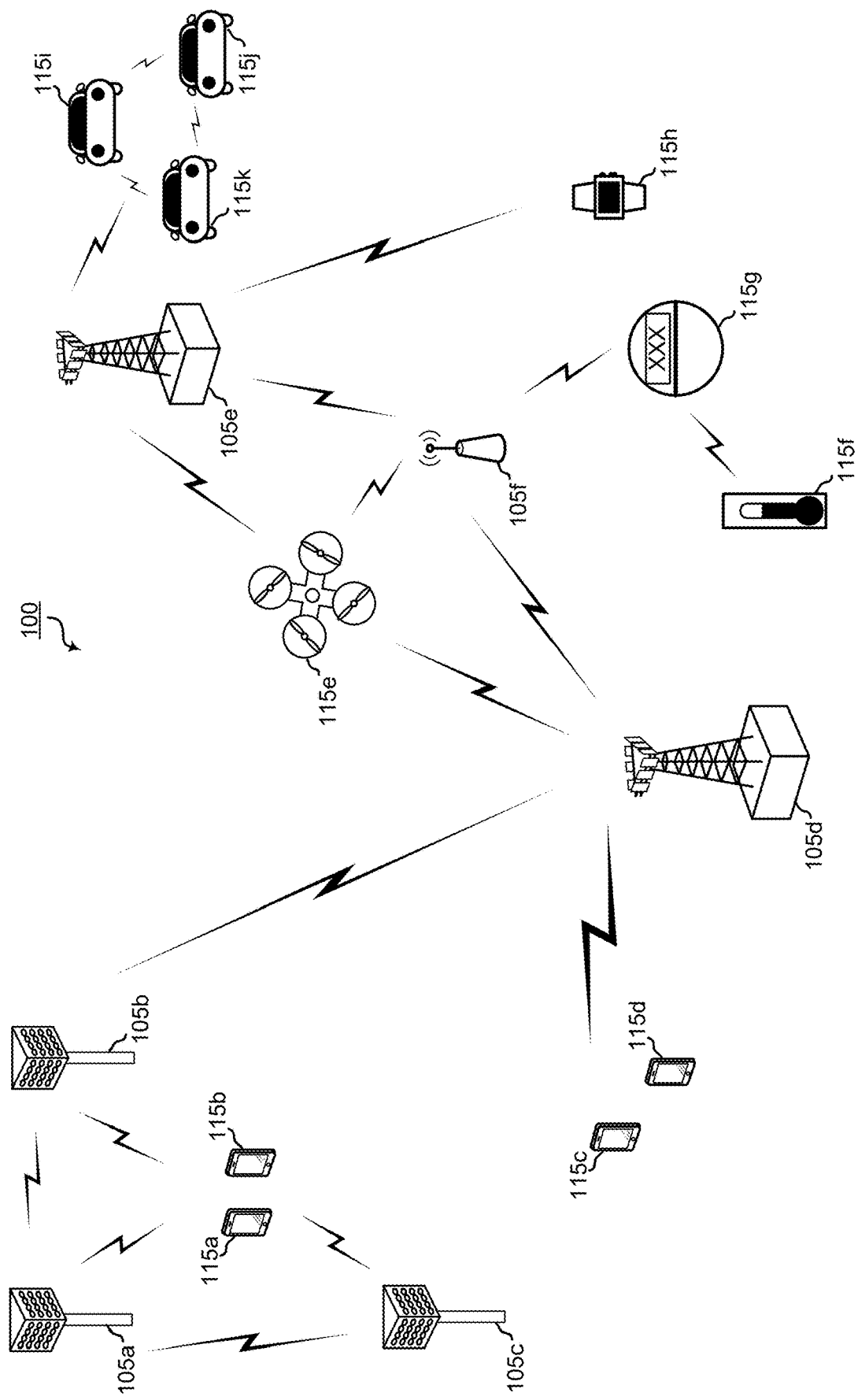
- FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of Things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, comprise a public land mobile network (PLMN) or some portion thereof, and may include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of Things" (IoT) or "Internet of Everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) or vehicle-to-everything (V2X) mesh network between UEs 115i-115k communicating with macro base station 105e.

Figure 2:
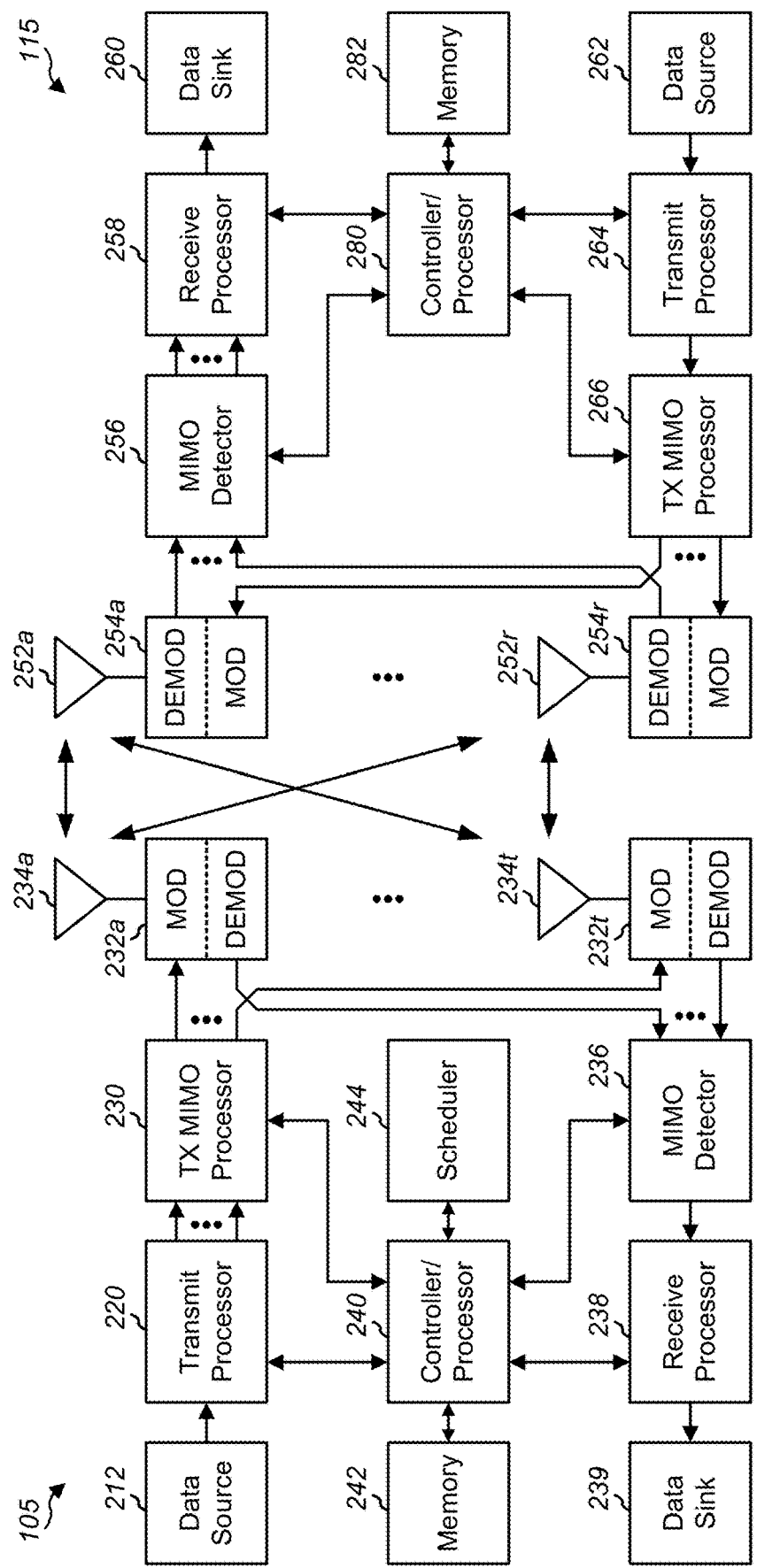
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 5-8, and/or other processes for the techniques described herein. Memories 242 and 282 may store data and program codes for base station 105 and UE 115, respectively. Scheduler 244 may schedule UEs for data transmission on the downlink and/or uplink.

Referring again to FIG. 1, wireless network 100 may be configured to implement an application architecture for edge computing, wherein various applications may be hosted on the edge of the wireless network. For example, base stations 105 of wireless network 100 may have connections with one or more gateway functions located close to or integrated with one or more edge servers supporting processing of intensive tasks (e.g., various virtual reality (VR), augmented reality (AR), extended reality (XR), etc. processing involving appreciable processing resource utilization) offloaded by a UE in communication with the edge server.

Figure 3A:
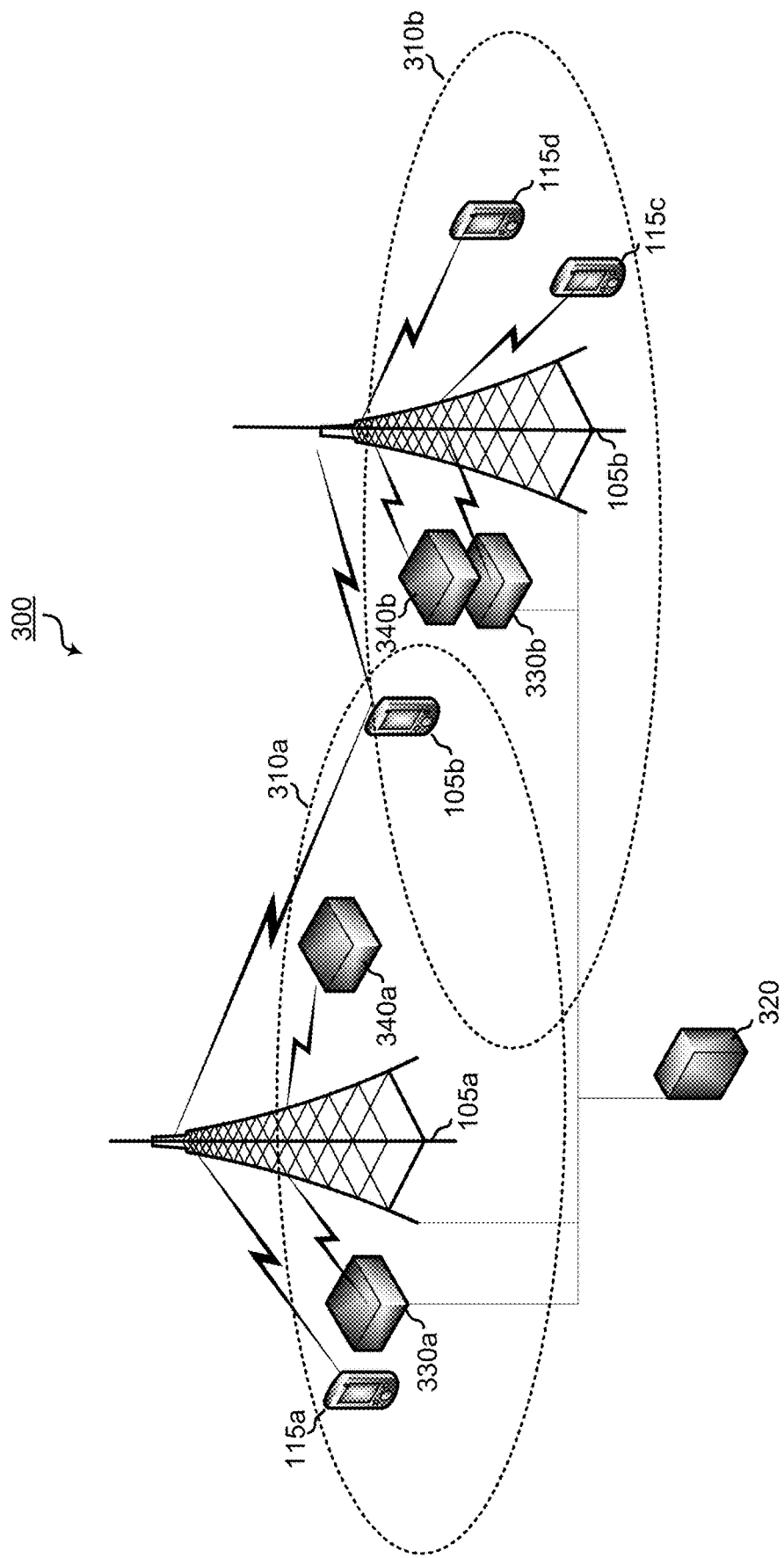
FIGS. 3A and 3B are block diagrams illustrating a portion of a wireless network implementing an application architecture for edge computing according to some embodiments of the present disclosure.

FIG. 3A illustrates a portion of wireless network 100 (e.g., a portion of a PLMN) implementing an application architecture for edge computing as edge computing architecture (ECA) 300. The example of FIG. 3A shows base stations 105a and 105b serving UEs 115a-115d within respective coverage areas 310a and 310b. ECA 300 of the example in FIG. 3A includes edge data network configuration server (ECS) 320, edge enabler servers (EESes) 330a and 330b, and edge application servers (EASes) 340a and 340b, wherein the systems of ECA 300 facilitate offloading of processing for various applications with respect to UEs operating within wireless network 100. ECS 320 may, for example, provide edge data network configuration information to UEs for use in implementing various aspects of edge data computing. EESes 330 may provide information to ECSes regarding associated EASes and/or their edge applications (e.g., availability, enablement, configuration, etc.). Additionally or alternatively, EESes 330 may expose capabilities of wireless network 100 to associated EASes and/or their edge applications. EASes 340 may comprise one or more application servers (e.g., multi-edge computing (MEC) systems) configured for hosting various edge applications for use by UEs 115.

Base stations 105 may communicate with the UEs (e.g., respective ones of UEs 115a-115d) via wireless links, as shown in the example of FIG. 3A. Base stations 105 are connected with one or more gateway functions (e.g., user plane functions (UPFs)) which communicate with one or more entities of an application architecture for edge computing (e.g., one or more ECA devices, such as ECS 320, EESes 330, and EASes 340), whereby the base stations may facilitate communication between UEs and a (local) UPF. Communications with respect to an ECA may be via wireless communication links, via wireline communication links (e.g., communication links provided by one or more local area networks (LANs), wide area networks (WANs), cable transmission systems, fiber optic transmission systems, etc.), or a combination thereof. ECA devices may communicate indirectly or directly.

It should be understood that the illustrated number of devices (e.g., base stations, UEs, ECSes, EES, EAS, etc.), types of devices, etc. shown in FIG. 3A are representative of a portion of a wireless network in which an ECA may be implemented and are simplified for facilitating an understanding of the concepts herein. Similarly, the illustrated communication links are representative of those that may be implemented with respect to an ECA. Accordingly, various numbers, types, configurations, etc. of devices and/or communications links may be utilized according to embodiments of the present disclosure. Moreover, although ECS 320, EESes 330, and EASes 340 are shown as separate from base stations 105 (e.g., located close to a respective base station 105), any or all of these ECA devices may be integrated with a base station or other device (e.g., processor-based system) of wireless network 100.

Figure 3B:
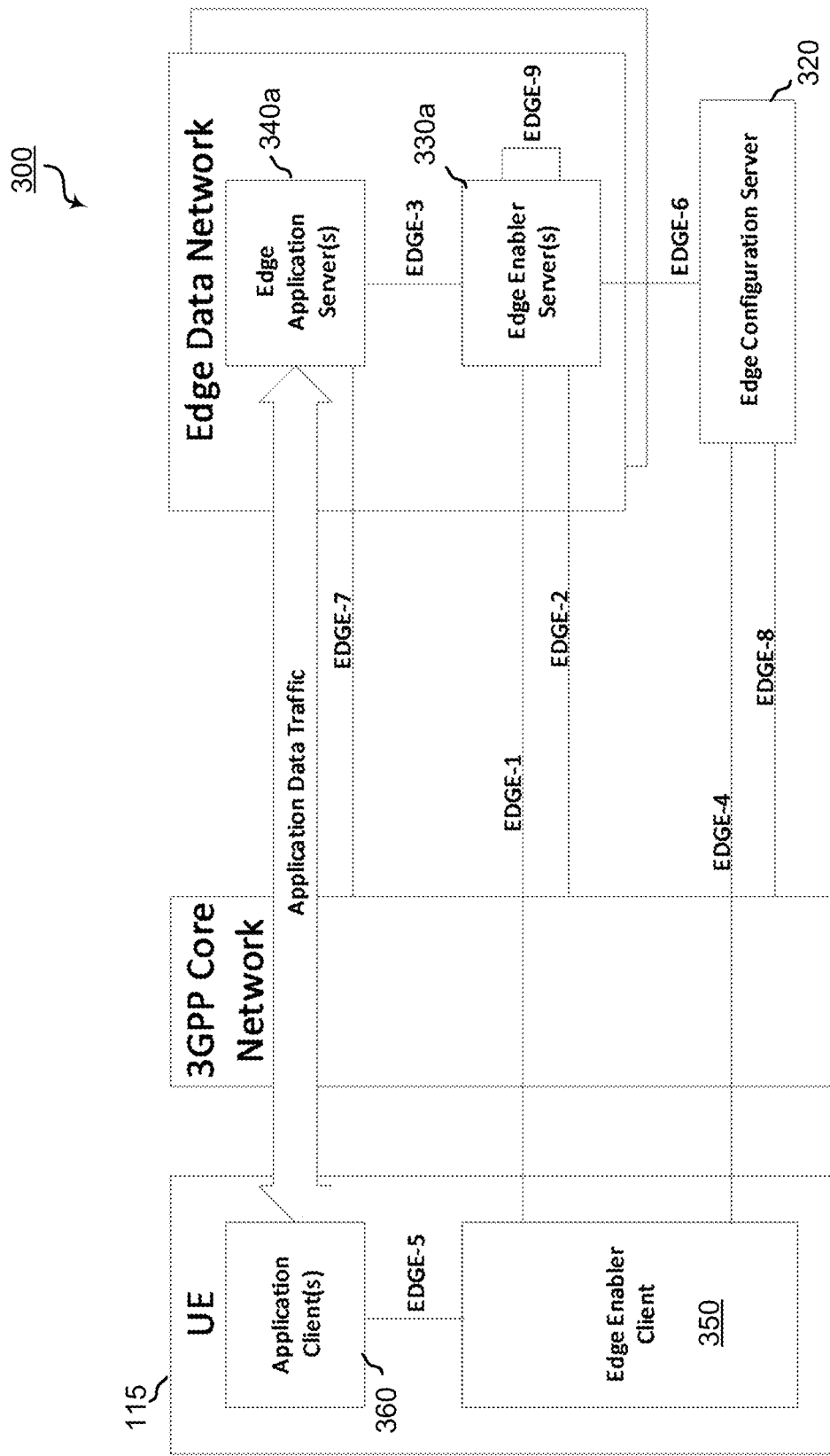

FIG. 3B shows a functional block diagram of ECA 300 as implemented in the portion of wireless network 100 shown in FIG. 3A. The functional block diagram of FIG. 3B conceptually illustrates the communication links between UE 115 (e.g., any of UEs 115*a*-115*d* shown in FIG. 3A) and ECS 320, EES 330*a*/EES 330*b*, and EAS 340*a*/EAS 340*b* of ECA 300 via the core network of wireless network 100, as well as the intercommunication of devices of ECA 300. Additionally, functional blocks of UE 115 facilitating edge computing using ECA 300 are shown in the functional block diagram of FIG. 3B. In particular, edge enabler client (EEC) 350 and application client(s) 360 are shown as functional blocks of UE 115 (e.g., logic executed by one or more processors of UE 115) operable to facilitate offloading of processing for various applications with respect to UE 115. EEC 350 may, for example, enable discovery of edge applications by application client(s) 360. Additionally or alternatively, EEC 350 may provide provisioning of configuration data with respect to edge applications. Application client(s) 360 may comprise one or more clients operable within the operating system environment of UE 115 providing interoperability with respect to corresponding edge applications.

In operation according to aspects of the present disclosure, ECA 300 enables various applications to be hosted on the edge of wireless network 100. Exposing the applications to UE mobility is a consequence of hosting applications at the edge of a wireless network. For example, various UEs (e.g., handheld devices, vehicles equipped for V2X communications, etc.), are highly mobile, and their movements may render the location of the currently used EAS non-optimal (e.g., an EAS hosting an offloaded application becomes more distant from the UE, resulting in application performance degradation, an increase in network congestion, etc.), although the underlying network may nevertheless maintain service continuity between the endpoints.

ECA 300 is configured to support application mobility, wherein an application instance that is serving a UE may be changed to a new location. Application mobility for a stateful service involves transferring and synchronizing the service state between the original and relocated application instance in order to provide service continuity. Accordingly, when implementing application mobility for stateful applications, the user context with respect to the application (i.e., the state of the user's instance of the edge application associated with an edge computing service) is also transferred by ECA 300. In operation of ECA 300, multiple instances of an edge application run concurrently. For example, a plurality of EASes disposed in one or more edge data networks (EDNs), such as may comprise one or more EESes and their associated one or more EASes, may concurrently run instances of an edge application. A state (context) of a source instance of the edge application may be captured in the source instance and copied to a target instance of the edge application independently from the operation of the instance itself. The target EAS to which an application context is to be transferred may be in a same or different EDN as the source EAS from which the context is transferred. Accordingly, EESes in different EDNs may interact to support application mobility. The edge computing service produced by the relocated context in the target edge application instance can continue in a seamless manner with respect to the UE.

Figure 4:
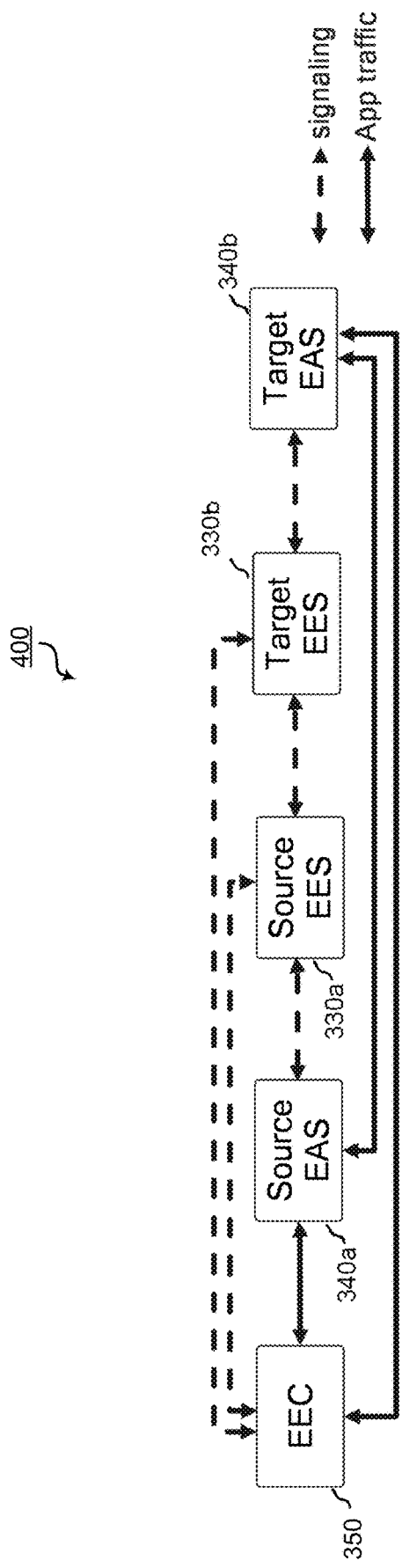
FIG. 4 is a block diagram illustrating interaction between devices of FIGS. 3A and 3B implementing an application context relocation procedure according to some embodiments of the present disclosure.

FIG. 4 illustrates application context relocation procedure 400 in which an application context is transferred between two EASes. In the example of FIG. 4, EAS 340*a* represents a source EAS (S-EAS) with respect to the application context transfer (e.g., an EAS currently serving one or more applications of application client(s) 360 executed by UE 115), and EAS 340*b* represents a target EAS (T-EAS) with respect to the application context transfer (e.g., an EAS for serving one or more applications of application client(s) 360 executed by UE 115 after the application context relocation procedure). In operation of application context relocation procedure 400, various signaling (e.g., to provide EEC information, EES information, EAS information, etc.) is implemented to facilitate transfer of an application context from the S-EAS to the T-EAS. Correspondingly, various application traffic (e.g., application context data, etc.) is communicated for implementing the application context transfer. Application context relocation procedure 400 is configured to provide service continuity in case of UE mobility or edge application mobility (e.g., in a situation where the UE moves to the T-EAS, the T-EAS is determined to have better key performance indicators (KPIs) as compared to the S-EAS, etc.) according to aspects of the present disclosure.

There have been two different approaches for application context relocation procedures proposed; a source EAS/EES triggered application context relocation procedure and an EEC triggered application context relocation procedure. In the proposed source EAS/EES triggered application context relocation procedure, a source EAS/EES detects a need for context relocation (e.g., relying on 3GPP event exposure application programming interface (API)), the source EES interacts with a target EES having an EAS associated therewith that supports the same application, and then notifies the source EAS for transfer of the application context. In the proposed EEC triggered application context relocation procedure, an EEC detects a need for context relocation and requests a target EES and the source EES to perform application context relocation. These two proposed approaches for application context relocation procedures diverge in order to achieve service continuity requirements. In particular, the proposed EEC triggered application context relocation procedure has a lack of commonality in the steps performed with respect to the proposed source EAS/EES triggered application context relocation procedure. Having such different end-to-end operations implemented for a same purpose (i.e., application context relocation) can present implementation and/or operational challenges.

UE triggered edge computing application context relocation procedures are provided in accordance with aspects of the present disclosure. A UE triggered edge computing application context relocation procedure according to some aspects of the disclosure may be configured to provide commonality in the steps performed with respect to one or more other application context relocation procedures (e.g., the aforementioned proposed source EAS/EES triggered application context relocation procedure).

In operation according to a UE triggered edge computing application context relocation procedure of some aspects of the disclosure, the UE may take more responsibility with respect to the application context transfer (e.g., to determine which EES is the best for the UE's current location, which in turn may determine a best EAS for the current location). A UE choosing a best EES (e.g., based on or otherwise corresponding to configured information from the ECS) according to aspects of the disclosure may provide a variety of benefits. For example, an EES (or EAS) may be alleviated from subscribing to location reporting from the 3GPP system (e.g., the EES/EAS may reduce its interaction with the network, reducing network traffic, freeing capacity, etc.). Moreover, a decision by the EEC may provide a faster way to determine to trigger application context relocation (e.g., waiting for location reporting from 3GPP system by the EES (or EAS) may be avoided). For example, if a UE detects poor quality of experience (QoE) or high round trip time (RTT), the UE can probe other EES(es), according to a UE triggered edge computing application context relocation procedure, and determine a better EES/EAS. In some situations, a S-EAS may not correctly determine the application client's condition. However, in a UE triggered edge computing application context relocation procedure of some aspects of the disclosure, an application client may have its logic determine connectivity status, and it can notify it to the EEC.

A UE triggered edge computing application context relocation procedure may perform a number of functions facilitating application context relocation (e.g., relocation of an application context from a source EAS (S-EAS) served by a source EES (S-EES) to a target EAS (T-EAS) served by a target EES (T-EES)) in which the UE takes primary responsibility with respect to the application context transfer. For example, the EEC of a UE configured to implement a UE triggered application context relocation procedure may perform general service provisioning (e.g., obtaining and storing EES information regarding EESes available in an ECA of a PLMN, or some portion thereof) ahead of application runtime (e.g., at a time of UE power-up, upon the UE joining the PLMN, etc.). In performing a service provisioning procedure, the EEC (e.g., operating under control of UE triggered application context relocation logic stored by memory 282 and executed by controller/processor 280 of UE 115) may communicate with one or more ECS of an ECA and obtain information regarding EES(es) in communication with each respective ECS (e.g., EES(es) local to a respective ECS) that are associated with EAS(es) suitable for providing one or more edge computing service with respect to the UE (e.g., EES(es) which can spin up an appropriate EAS). The UE may store (e.g., within an edge configuration information database) obtained information, such as EES information for a plurality of EESes of the ECA, for later use in UE triggered application context relocation. At an initial edge application run-time, the EEC may perform EAS discovery and select a particular EAS, served by a respective EES, for use with respect to the edge application. Thereafter, the EEC may communicate with the selected EAS (e.g., an initial S-EAS of a subsequent application context relocation operation), whereby the UE uses edge computing service for the EAS.

In accordance with a UE triggered application context relocation procedure, during operation (e.g., while the UE is using an edge computing service in correspondence with the S-EAS and S-EES), the EEC may perform EES probing (e.g., initiate an EAS discovery procedure or other procedure asking for service with respective EESes of the plurality of EESes) with other EES(es) (e.g., EESes identified in the information stored in the edge configuration information database) to see if an EAS that is "better" than the current EAS (S-EAS) may be identified. The EEC (e.g., operating under control of the UE triggered application context relocation logic) may determine to perform EES probing based on or otherwise in correspondence to a variety of factors. For example, determining to perform EES probing may be based on or otherwise performed in association with expiration of an in-service discovery timer, observation of a degraded indicator of key performance indicators (KPIs) with the S-EAS, detection of UE mobility (e.g., change of Tracking Area ID/Cell ID, range information, GPS information, etc.), change of requirements by an application client of the UE using the edge computing service (e.g., change of required KPI, change of an application client's available service area, change of user priority, etc.), a request by the application client (e.g., a request re-establishing application server connection, associated with UE mobility, etc.), or any combination thereof. In response to EES probing by the EEC, each probed EES may respond with various information, such as an offer including EAS KPIs. The EEC may collect this information and/or other information useful in EES/EAS selection (e.g., RTT information, such as where an assumption is made that if the UE probes a better quality of packet transmission with an EES the UE can consider the EAS served by the EES as a better EAS) for identifying an EES/EAS (e.g., T-EES and/or T-EAS) for application context relocation).

Based upon or otherwise in correspondence to the EES probing, the EEC (e.g., operating under control of the UE triggered application context relocation logic) may make a determination to move to another EES serving the "better" EAS. For example, the EEC may select a T-EES and a T-EAS for relocation of the application context based upon or otherwise in correspondence to the probing. In accordance with some aspects of the disclosure, the EEC may select the T-EES for relocation of the application context based upon or otherwise in association with the probing indicating that the T-EAS served by the T-EES is a best EAS of EASes served by the probed EESes, wherein the T-EAS is identified as the best EAS of the probed EASes based upon or otherwise corresponding to comparison of KPIs information obtained by the probing indicating that the T-EAS has best KPIs of probed EASes. Additionally or alternatively, the EEC may select the T-EAS for relocation of the application context based upon or otherwise in correspondence to the probing indicating that the T-EES serving the T-EAS has a lowest RTT of probed EESes.

The EEC may request application context relocation (e.g., from the S-EES to a T-EES) in response to the EES probing. In accordance with a UE triggered application context relocation procedure of some aspects of the disclosure, the EEC (e.g., operating under control of the UE triggered application context relocation logic) may request application context relocation according to a S-EES centric protocol, as described further below with reference to FIGS. 5 and 7, or according to a T-EES centric protocol, as described further below with reference to FIGS. 6 and 8. In response to the application context relocation request, the S-EES and T-EES may perform application context relocation (e.g., implementing steps having commonality with steps performed with respect to one or more other application context relocation procedures, such as an EAS/EES triggered application context relocation procedure) whereby the user context (i.e., the state of an instance of an edge application executed in association with the UE) is transferred from the S-EAS to the T-EAS. Thereafter, the S-EES (e.g., according to a S-EES centric protocol) or T-EES (e.g., according to a T-EES centric protocol) may inform the EEC of completion of the application context relocation procedure, such as to facilitate the EEC accessing the T-EAS for continued edge computing service produced by the relocated context in the T-EAS application instance. In accordance with some aspects of the disclosure, the EEC may perform a registration process or an application context relocation complete notification process establishing an association in which the EEC is served by the T-EES and using a T-EAS associated with the T-EES.

A UE triggered edge computing application context relocation procedure of aspects of the present disclosure may be repeated a number of times to accommodate continued mobility of the UE. For example, the T-EAS and the T-EES serving the T-EAS to which an application context is transferred may later be a S-TAS and S-EES for which application context relocation is initiated.

Figure 5:
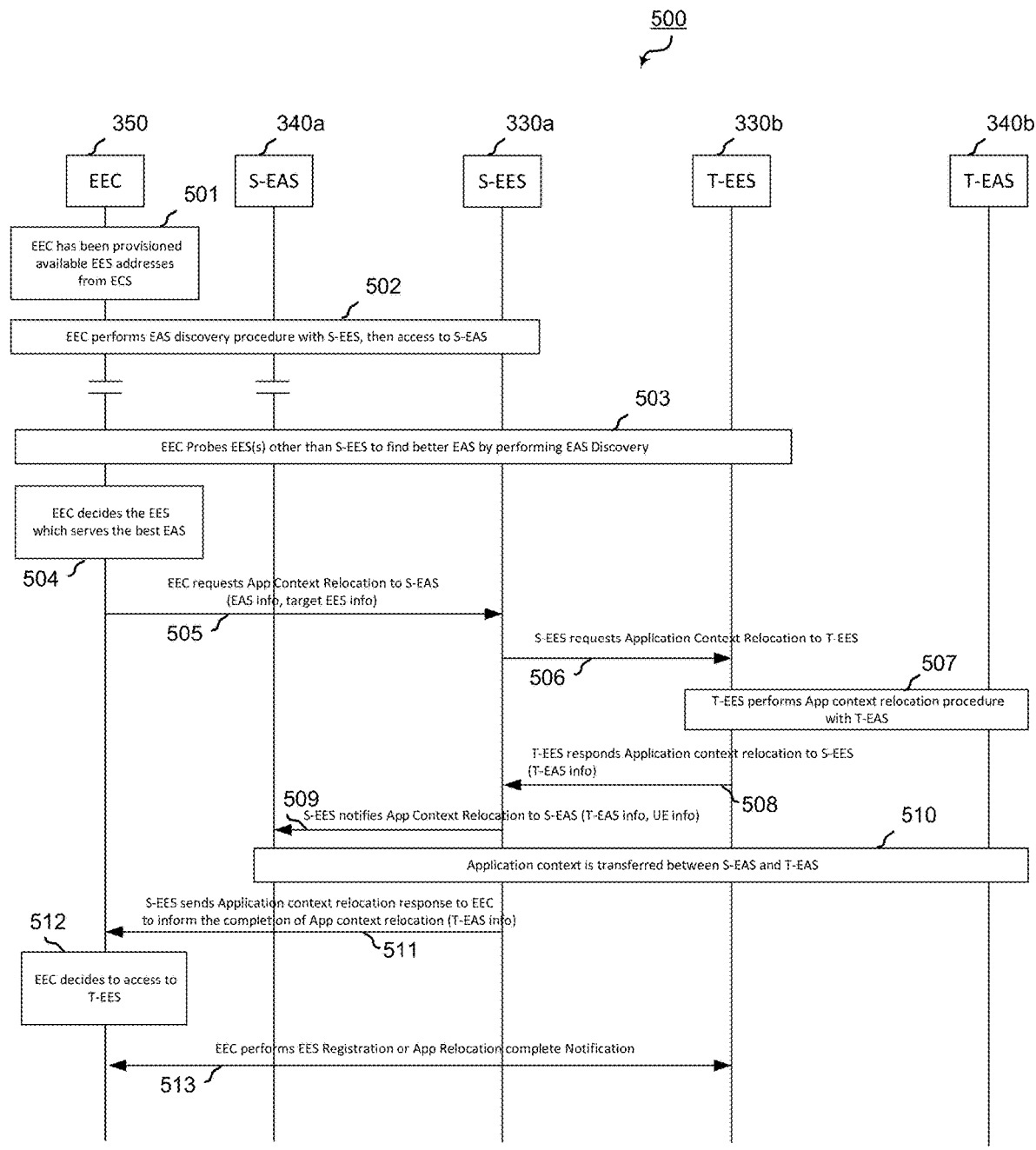
Figure 6:
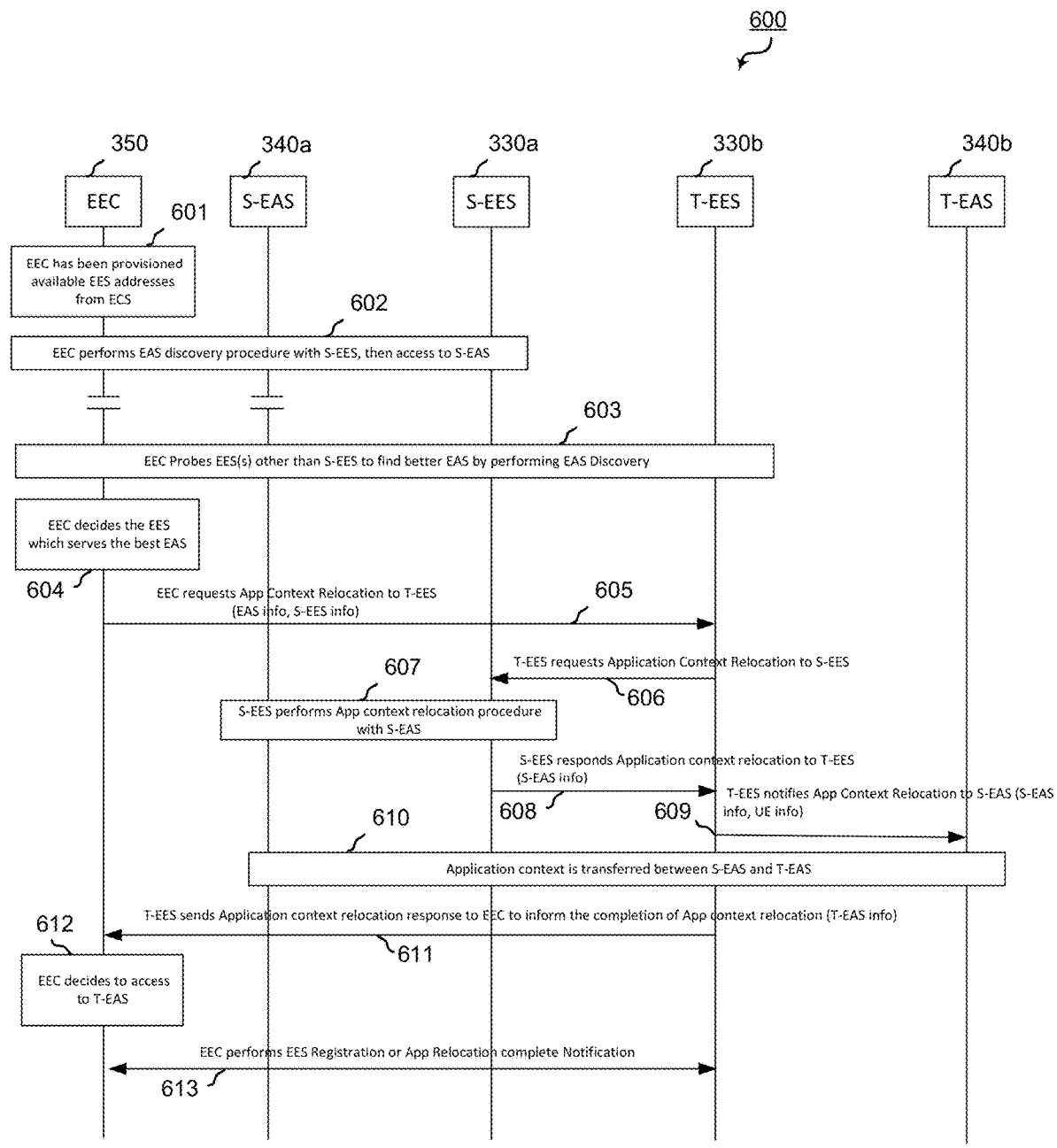

Having generally described UE triggered application context relocation procedures above, UE triggered application context relocation procedures implementing S-EES centric and T-EES centric protocols will be described with reference to FIGS. 5 and 6. In particular, the ladder flow diagram of FIG. 5 illustrates operation according to an example UE triggered application context relocation procedure implementing a S-EES centric protocol. The ladder flow diagram of FIG. 6 illustrates operation according to an example UE triggered application context relocation procedure implementing a T-EES centric protocol.

Referring first to FIG. 5, S-EES centric UE triggered application context relocation procedure 500 is shown. At item 501 of the example in FIG. 5, EEC 350 obtains EES information regarding EESes that are available in an ECA of the PLMN. For example, the EEC may perform a general service provisioning procedure prior to runtime of edge computing applications to obtain EES information, such as may comprise information regarding EES identification, EES location, EAS(es) associated with a respective EES, edge applications supported by EAS(es) associated with a respective EES, EES affiliation with a ECS, etc. A general service provisioning procedure may, for example, be performed at a time of UE power-up, upon the UE joining the PLMN, etc. to obtain EES information. The EES information for the plurality of EESes may, for example, be stored (e.g., in an edge configuration information database) by the UE as part of the general service provisioning procedure.

At item 502 of the illustrated example, EEC 350 may perform an EAS discovery procedure or other procedure to identify an EAS for use with respect to an edge application. For example, at an initial edge application run-time, the EEC may perform EAS discovery and select a particular EAS (e.g., an initial S-EAS), served by a respective EES (e.g., an initial S-EES), for use with respect to the edge application, whereby the UE may use edge computing service for the EAS.

While EEC 350 is running on edge computing service with S-EAS 340a and S-EES 330a, the EEC may probe EES(es) based on, using, or otherwise in correspondence to previously obtained EES information (e.g., EESes probed may be identified, selected, communicated with, etc. from or in association with EES information stored in the edge configuration information database) at item 503. For example, EEC 350 may probe one or more EESes based on or otherwise in correspondence to the EES information to identify an EAS other than S-EAS 340a for use with respect to the edge computing service. In accordance with some aspects of the disclosure, the EEC may determine to perform probing of the one or more EESes while the UE is using the edge computing service in correspondence with S-EAS 340a and S-EES 330a based on or otherwise in correspondence to various criteria. For example, the EEC may determine to perform EES probing based on, in association with, or otherwise in correspondence to expiration of an in-service discovery timer, observation of a degraded indicator of KPIs with the S-EAS, detection of UE mobility, change of requirements by an application client of the UE using the edge computing service, a request by the application client, etc. In accordance with some aspects of the disclosure, the EES probing may be performed as part of a procedure asking for service with respective EESes of a plurality of EESes (e.g., an EAS discovery procedure). The EEC may, for example, obtain offer responses from the probed EESes including KPIs information for EASes served by the respective EESes.

At item 504, EEC 350 may analyze the results of the EES probing and, based on or otherwise in correspondence to the EES probing results, determine a best EES which serves the same EAS profile with what the UE is using. In accordance with some aspects of the disclosure, the EEC may select a T-EES for relocation of the application context based upon or otherwise in correspondence to the probing indicating that the T-EAS served by the T-EES is a best EAS of EASes served by the probed EESes. For example, the T-EAS may be identified as the best EAS of the probed EASes based upon or otherwise corresponding to comparison of KPIs information obtained by the probing indicating that the T-EAS has best KPIs of probed EASes. Additionally or alternatively, the T-EES and/or the T-EAS may be selected for relocation of the application context based upon or otherwise in correspondence to the probing indicating that the T-EES serving the T-EAS has a lowest RTT of probed EESes.

EEC 350 may, based upon or otherwise corresponding to the EES probing results analysis, request application context relocation using a S-EAS centric protocol at item 505 of the example of FIG. 5. For example, the EEC may provide an application context relocation request to S-EES 330a (e.g., to tell the S-EES to "please move my context to HERE," and providing details of T-EAS and/or T-EES to which the application context is to be transferred). The application context relocation request may include T-EES information and/or EAS information for relocation of the application context. For example, the T-EES information may identify a particular EES as the T-EES for the application context relocation request. The EAS information may be configured to enable the S-EES to identify application context information for relocating the application context from S-EAS 340a to T-EAS 340b associated with T-EES 330b.

In accordance with some aspects of the disclosure, the application context relocation request is configured to cause the S-EES to initiate application context relocation (e.g., to transfer the application context from S-EAS 340a to T-EAS 340b). Items 506-510 of the illustrated example show interaction between the S-EAS/S-EES and T-EAS/T-EES for performing application context relocation. For example, S-EES 330a receives the application context relocation request message from EEC 350, and may check information included in the message (e.g., T-EAS/T-EES information, etc.) to determine the T-EES and/or T-EAS and perform application context relocation processing in cooperation with T-EES 330b and T-EAS 340b. Accordingly, at item 506 of the illustrated example S-EES 330*a* provides an application context relocation request to T-EES 330*b*, providing the T-EAS with information (e.g., S-EAS information, UE information, etc.) for facilitating the application context transfer. In response, T-EES 330*b* and T-EAS 340*b* perform application context relocation procedure processing to prepare for the application context transfer at item 507. At item 508, T-EES 330*b* provides an application context relocation request response to S-EES 330*a* including information (e.g., T-EAS information, etc.) for facilitating the application context transfer. In response, at item 509, S-EES 330*a* notifies S-EAS 340*a* of the application context relocation, providing the S-EAS with information (e.g., T-EAS information, UE information, etc.) for facilitating the application context transfer. At item 510 of the illustrated example, the application context is transferred between S-EAS 340*a* and T-EAS 340*b*. Thereafter, S-EES 330*a* provides an application context relocation response to EEC 350 to inform the EEC of the completion of the application context relocation, providing the EEC with information (e.g., T-EAS information, etc.) for facilitating the application context transfer.

At item 512 of the example shown in FIG. 5, in response to the application context relocation response indicating completion of the application context relocation, EEC 350 determines that it is to access the T-EES with respect to the edge application of the transferred application context. In accordance with some aspects of the disclosure, a registration process or an application context relocation complete notification process may be used for establishing an association in which an EEC is served by a T-EES and using a T-EAS associated with the T-EES. Accordingly, at item 513, EEC 350 may perform a registration process or an application context relocation complete notification process to establish the association that the EEC is now served by the T-EES and using the T-EAS. T-EES 330*b* may, for example, receive an application context relocation complete notification process message from EEC 350 and in response the T-EES may establish the association that the EEC is now served by T-EES 330*b* using T-EAS 340*b*.

Referring now to FIG. 6, T-EES centric UE triggered application context relocation procedure 600 is shown. Operation according to items 601-604 of the example of FIG. 6 is as described above with reference to items 501-504 of FIG. 5. Accordingly, these items will not be further described with reference to FIG. 6.

EEC 350 may, based on or otherwise in correspondence to EES probing results analysis at item 604, request application context relocation using a T-EAS centric protocol at item 605 of the example of FIG. 6. For example, the EEC may provide an application context relocation request to T-EES 330*b* (e.g., to tell the T-EES to "please move my context from HERE," and providing details of S-EAS and/or S-EES from which the application context is to be transferred). The application context relocation request may include EAS information and/or S-EES information for relocation of the application context. For example, the S-EES information may identify a particular EES as the S-EES in use by the EEC. The EAS information may be configured to enable the T-EES to identify application context information for relocating the application context from S-EAS 340*a* in use by the EEC to T-EAS 340*b* associated with T-EES 330*b*.

In accordance with some aspects of the disclosure, the application context relocation request is configured to cause the T-EES to initiate application context relocation (e.g., to transfer the application context from S-EAS 340*a* to T-EAS 340*b*). Items 606-610 of the illustrated example show interaction between the S-EAS/S-EES and T-EAS/T-EES for performing application context relocation. For example, T-EES 330*b* receives the application context relocation request message from EEC 350, and may check information included in the message (e.g., S-EAS/S-EES information, etc.) to determine the S-EES and/or S-EAS and perform application context relocation processing in cooperation with S-EES 330*a* and S-EAS 340*a*. Accordingly, at item 606 of the illustrated example T-EES 330*b* provides an application context relocation request to S-EES 330*a*, providing the S-EAS with information (e.g., T-EAS information, UE information, etc.) for facilitating the application context transfer. In response, S-EES 330*a* and S-EAS 340*a* perform application context relocation procedure processing to prepare for the application context transfer at item 607. At item 608, S-EES 330*a* provides an application context relocation request response to T-EES 330*b* including information (e.g., S-EAS information, etc.) for facilitating the application context transfer. In response, at item 609, T-EES 330*b* notifies T-EAS 340*b* of the application context relocation, providing the T-EAS with information (e.g., S-EAS information, UE information, etc.) for facilitating the application context transfer. At item 610 of the illustrated example, the application context is transferred between S-EAS 340*a* and T-EAS 340*b*. Thereafter, T-EES 330*b* provides an application context relocation response to EEC 350 to inform the EEC of the completion of the application context relocation, providing the EEC with information (e.g., T-EAS information, etc.) for facilitating the application context transfer.

Operation according to items 612 and 613 of the example of FIG. 6 is as described above with reference to items 512 and 513 of FIG. 5. Accordingly, these items will not be further described with reference to FIG. 6.

FIGS. 7 and 8 show flow charts of functions performed by a UE implementing examples of UE triggered application context relocation procedures according to some aspects of the present disclosure. In particular, the flow diagram of FIG. 7 illustrates functions of a UE performing an example UE triggered application context relocation procedure implementing a S-EES centric protocol. The flow diagram of FIG. 8 illustrates functions of a UE performing an example UE triggered application context relocation procedure implementing a T-EES centric protocol.

Referring first to the S-EES centric UE triggered application context relocation procedure of example flow 700 shown in FIG. 7, a UE may store EES information for a plurality of EESes of an ECA available in a PLMN at block 701. For example, as described above, a UE may perform general service provisioning to obtain EES information regarding EESes available in an ECA of a PLMN, or some portion thereof. The EES information may, for example, be obtained ahead of application runtime, such as at a time of UE power-up, upon the UE joining the PLMN, etc. In performing a service provisioning procedure, an EEC of the UE may communicate with one or more ECS of an ECA and obtain information regarding EES(es) in communication with each respective ECS that are associated with EAS(es) suitable for providing one or more edge computing services with respect to the UE. The UE may store the EES information within an edge configuration information database, such as for later use in UE triggered application context relocation.

At block 702 of flow 700, an EEC of the UE may probe one or more EESes of the plurality of EESes while the UE is using an edge computing service in correspondence with a S-EAS and S-EES. For example, the EES may probe one or more EESes in correspondence to the EES information to identify an EAS other than the S-EAS for use with respect to the edge computing service. The EEC may, for example, initiate an EAS discovery procedure or other procedure asking for service with respective EESes of the plurality of EESes to perform EAS probing of EESes identified in the information stored in the edge configuration information database. In accordance with some examples, the EEC may determine to perform EES probing based on or otherwise performed in association with expiration of an in-service discovery timer, observation of a degraded indicator of KPIs with the S-EAS, detection of UE mobility (e.g., change of Tracking Area ID/Cell ID, range information, GPS information, etc.), change of requirements by an application client of the UE using the edge computing service (e.g., change of required KPI, change of an application client's available service area, change of user priority, etc.), or a request by the application client (e.g., a request re-establishing application server connection, associated with UE mobility, etc.), or any combination thereof.

The EEC may provide an application context relocation request to the S-EES in correspondence to the probing identifying an EAS other than the S-EAS for use with respect to the edge computing service, at block 703 of the example illustrated in FIG. 7. The application context relocation request may, for example, include EAS information for relocation of an application context associated with the edge computing service. The EAS information may be configured to enable the S-EES to identify application context information for relocating the application context from the S-EAS to a T-EAS associated with a T-EES for the application context relocation request. The application context relocation request of some examples may include T-EES information. The T-EES information may identify a particular EES as the T-EES for the application context relocation request. The EEC may, for example, analyze the results of the EES probing and determine a best EES (e.g., based on or otherwise performed in association with comparison of KPIs information obtained by the probing indicating that the T-EAS has best KPIs of probed EASes, based on or otherwise corresponding to a T-EES having a lowest RTT, etc.) which serves the same EAS profile with what the UE is using to thereby identify a T-EES (and resultantly a T-EAS). In response to the application context relocation request, the S-EES may initiate application context relocation whereby the user context is transferred from the S-EAS to the T-EAS.

Referring now to the T-EES centric UE triggered application context relocation procedure of example flow 800 shown in FIG. 8, a UE may store EES information for a plurality of EESes of an ECA available in a PLMN at block 801. For example, as described above, a UE may perform general service provisioning to obtain EES information regarding EESes available in an ECA of a PLMN, or some portion thereof. The EES information may, for example, be obtained ahead of application runtime, such as at a time of UE power-up, upon the UE joining the PLMN, etc. In performing a service provisioning procedure, an EEC of the UE may communicate with one or more ECS of an ECA and obtain information regarding EES(es) in communication with each respective ECS that are associated with EAS(es) suitable for providing one or more edge computing services with respect to the UE. The UE may store the EES information within an edge configuration information database, such as for later use in UE triggered application context relocation.

At block 802 of flow 800, an EEC of the UE may probe one or more EESes of the plurality of EESes while the UE is using an edge computing service in correspondence with a S-EAS and S-EES. For example, the EES may probe one or more EESes in correspondence to the EES information to identify an EAS other than the S-EAS for use with respect to the edge computing service. The EEC may, for example, initiate an EAS discovery procedure or other procedure asking for service with respective EESes of the plurality of EESes to perform EAS probing of EESes identified in the information stored in the edge configuration information database. In accordance with some examples, the EEC may determine to perform EES probing based on or otherwise performed in association with expiration of an in-service discovery timer, observation of a degraded indicator of KPIs with the S-EAS, detection of UE mobility (e.g., change of Tracking Area ID/Cell ID, range information, GPS information, etc.), change of requirements by an application client of the UE using the edge computing service (e.g., change of required KPI, change of an application client's available service area, change of user priority, etc.), or a request by the application client (e.g., a request re-establishing application server connection, associated with UE mobility, etc.), or any combination thereof.

The EEC may provide an application context relocation request to a T-EES in correspondence to the probing identifying an EAS other than the S-EAS for use with respect to the edge computing service, at block 803 of the example illustrated in FIG. 8. The application context relocation request may, for example, include EAS information for relocation of an application context associated with the edge computing service. The EAS information may be configured to enable the T-EES to identify application context information for relocating the application context from the S-EAS in use by the EEC to a T-EAS associated with the T-EES. The application context relocation request of some examples may include S-EES information. The S-EES information may identify a particular EES as the S-EES for the application context relocation request. The EEC may, for example, analyze the results of the EES probing and determine a best EES (e.g., based on or otherwise performed in association with comparison of KPIs information obtained by the probing indicating that the T-EAS has best KPIs of probed EASes, based on or otherwise corresponding to a T-EES having a lowest RTT, etc.) which serves the same EAS profile with what UE is using to thereby identify a T-EES (and resultantly a T-EAS). In response to the application context relocation request, the T-EES may initiate application context relocation whereby the user context is transferred from the S-EAS to the T-EAS.

Figure 9:
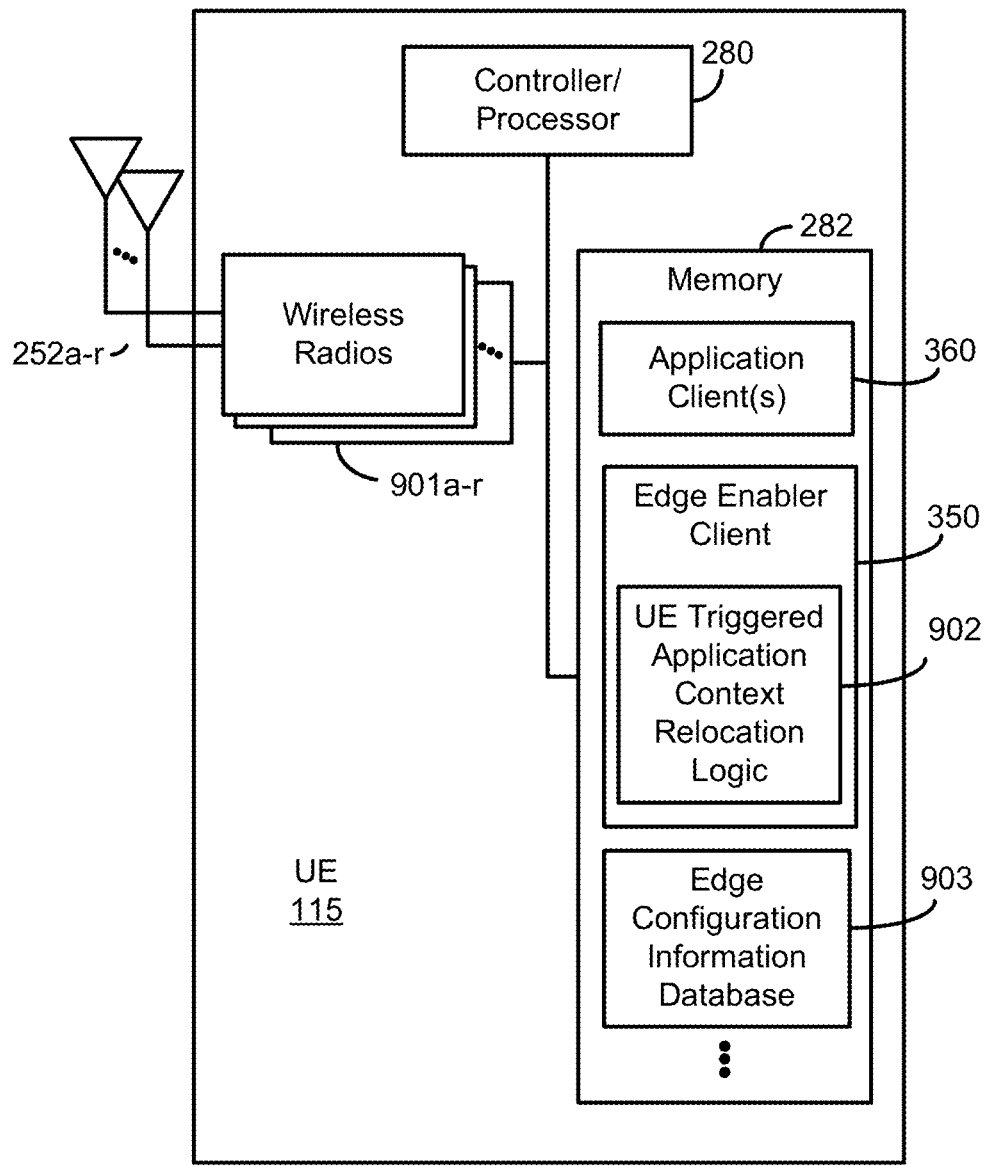
FIG. 9 is a block diagram conceptually illustrating a design of a UE configured for UE triggered application context relocation procedures according to some embodiments of the present disclosure.

FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 901*a-r* and antennas 252*a-r*. Wireless radios 901*a-r* include various components and hardware, as illustrated in FIG. 2 for UE 115, including modulator/demodulators 254*a-r*, MIMO detector 256, receive processor 258, transmit processor 264, and TX MIMO processor 266.

UE 115 of the example shown in FIG. 9 includes EEC 350 and application client(s) 360, as described above, and additionally UE triggered application context relocation logic 902 and edge configuration information database 903, some or all of which may be utilized for performing functions as described herein with respect to UE triggered application context relocation procedures according to some aspects of the present disclosure. EEC 350, application client(s) 360, and UE triggered application context relocation logic 902 may, for example, comprise program code stored in memory 282 that is executed by controller/processor 280 for providing respective functionality. UE triggered application context relocation logic 902 may be configured for facilitating a UE triggered application context relocation procedure implementing a S-EES centric protocol and/or a UE triggered application context relocation procedure implementing a T-EES centric protocol. UE triggered application context relocation logic 902 may comprise a control logic module (e.g., forming part of, or separate from, EEC 350) providing control with respect to EEC 350 and/or otherwise implementing functionality to facilitate UE triggered application context relocation procedure functionality as described herein. In the context of a S-EES centric UE triggered application context relocation procedure, UE triggered application context relocation logic 902 may provide and/or control functionality including storing EES information, probing one or more EESes in correspondence to the EES information, providing an application context relocation request to a S-EES for initiating application context relocation, etc. In the context of a T-EES centric UE triggered application context relocation procedure, UE triggered application context relocation logic 902 may provide and/or control functionality including storing EES information, probing one or more EESes in correspondence to the EES information, providing an application context relocation request to a T-EES for initiating application context relocation, etc.

Figure 10:
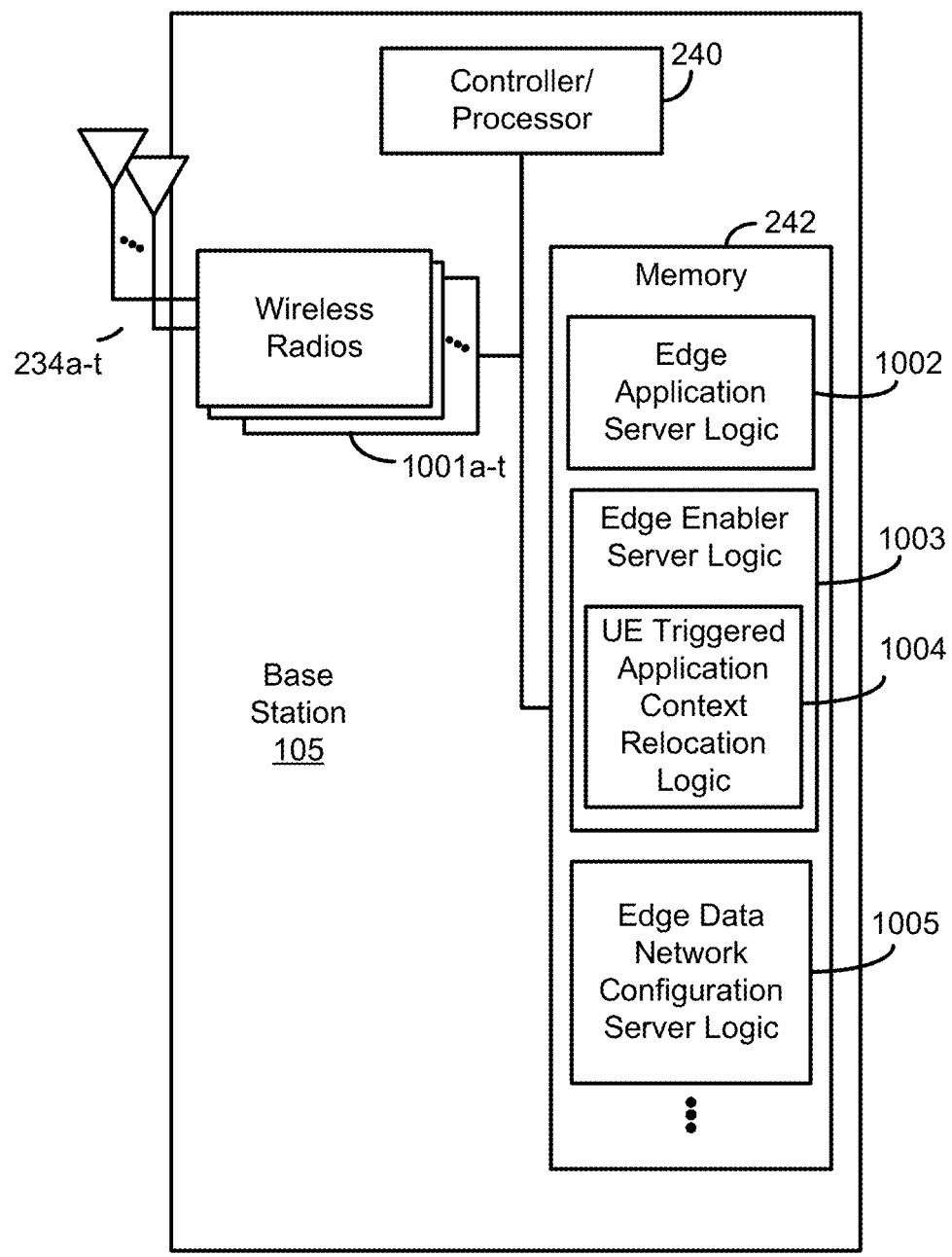
FIG. 10 is a block diagram conceptually illustrating a design of a base station configured for UE triggered application context relocation procedures according to some embodiments of the present disclosure.

FIG. 10 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1001*a-t* and antennas 234*a-t*. Wireless radios 1001*a-t* include various components and hardware, as illustrated in FIG. 2 for base station 105, including modulator/demodulators 232*a-t*, MIMO detector 236, receive processor 238, transmit processor 220, and TX MIMO processor 230.

Base station 105 of the example shown in FIG. 10, illustrating an implementation of a base station integrated with edge computing enabling architecture, includes edge configuration server logic 1002, edge enabler server logic 1003, UE triggered application context relocation logic 1004, and edge data network configuration server logic 1005, some or all of which may be utilized for performing functions as described herein with respect to UE triggered application context relocation procedures according to some aspects of the present disclosure. Edge configuration server logic 1002, edge enabler server logic 1003, UE triggered application context relocation logic 1004, and edge data network configuration server logic 1005 may, for example, comprise program code stored in memory 242 that is executed by controller/processor 240 for providing respective functionality. Edge configuration server logic 1002 may be executed to implement one or more instances of EAS(es) 340 described above. Similarly, edge enabler server logic 1003 may be executed to implement one or more instances of EES(es) 330 described above. Edge data network configuration server logic 1005 may be executed to implement one or more instances of ECS(es) 320 described above. Although the example of FIG. 10 shows edge configuration server logic 1002, edge enabler server logic 1003, UE triggered application context relocation logic 1004, and edge data network configuration server logic 1005 provided as integrated with base station 105, it should be understood that any or all such logic may be provided and/or executed by processor-based platforms (e.g., server systems) separate from a base station (e.g., disposed in an ECA of the PLMN). UE triggered application context relocation logic 1004 may be configured for facilitating a UE triggered application context relocation procedure implementing a S-EES centric protocol and/or a UE triggered application context relocation procedure implementing a T-EES centric protocol. UE triggered application context relocation logic 1004 may comprise a control logic module (e.g., forming part of, or separate from, edge enabler server logic 1003) providing control with respect to EES 330 and/or otherwise implementing functionality to facilitate UE triggered application context relocation procedure functionality as described herein. In the context of a S-EES centric UE triggered application context relocation procedure, UE triggered application context relocation logic 1004 may provide and/or control functionality including receiving an application context relocation request message sent by an EEC to an EES instance operating as a S-EES, checking information included in the message (e.g., T-EAS/T-EES information, etc.) to determine the T-EES and/or T-EAS, and performing application context relocation processing in cooperation with the T-EES and/or T-EAS. In the context of a T-EES centric UE triggered application context relocation procedure, UE triggered application context relocation logic 1004 may provide and/or control functionality including receiving an application context relocation request message sent by an EEC to an EES instance operating as a T-EES, checking information included in the message (e.g., S-EAS/S-EES information, etc.) to determine the S-EES and/or S-EAS, and performing application context relocation processing in cooperation with the S-EES and/or the S-EAS.

In some examples of methods, the apparatuses, and articles including non-transitory computer-readable medium described herein, various aspects of UE triggered application context relocation may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for storing, by a UE, EES information for a plurality of EESes of an ECA available in a PLMN; probing, by an EEC of the UE while the UE is using an edge computing service in correspondence with a S-EAS and S-EES, one or more EESes of the plurality of EESes in correspondence to the EES information to identify an EAS other than the S-EAS for use with respect to the edge computing service; and providing, by the EEC of the UE to the S-EES, an application context relocation request including EAS information for relocation of the application context based on or otherwise in correspondence to the probing identifying the EAS other than the S-EAS for use with respect to the edge computing service.

2. The methods, apparatuses, and articles of clause 1, wherein the EAS information is configured to enable the S-EES to identify application context information for relocating the application context from the S-EAS in use by the EEC to a T-EAS associated with a target EES (T-EES) for the application context relocation request.

3. The methods, apparatuses, and articles of any of clauses 1-2, further providing for performing, by the EEC, a general service provisioning procedure prior to runtime of edge computing applications, wherein the EES information for the plurality of EESes is stored for use in triggering the application context relocation request as part of the general service provisioning procedure.

4. The methods, apparatuses, and articles of clause 3, wherein the general service provisioning procedure is performed at a time of UE power-up, or upon the UE joining the PLMN.

5. The methods, apparatuses, and articles of any of clauses 1-4, further providing for obtaining, by the EEC from one or more ECSes of the ECA, the EES information for the plurality of EESes, wherein the EES information includes information regarding one or more EESes in communication with a respective ECS that are associated with an EAS suitable for providing one or more edge computing service with respect to the UE.

6. The methods, apparatuses, and articles of any of clauses 1-5, further providing for performing, by the EEC, an EAS discovery procedure at an initial edge computing application runtime; selecting, by the EEC, the S-EAS based on or otherwise in correspondence to the EAS discovery procedure; and using, by the UE, the edge computing service as provided by the S-EAS.

7. The methods, apparatuses, and articles of any of clauses 1-6, further providing for determining, by the EEC while the UE is using the edge computing service in correspondence with the S-EAS and S-EES, to perform the probing of the one or more EESes of the plurality of EESes.

8. The methods, apparatuses, and articles of clause 7, wherein the determining to perform probing of the one or more EESes of the plurality of EESes is performed in association with one or more of expiration of an in-service discovery timer, observation of a degraded indicator of KPIs with the S-EAS, detection of UE mobility, change of requirements by an application client of the UE using the edge computing service, or a request by the application client.

9. The methods, apparatuses, and articles of any of clauses 1-8, wherein the probing of the one or more EESes of the plurality of EESes is performed as part of a procedure asking for service with respective EESes of the plurality of EESes.

10. The methods, apparatuses, and articles of clause 9, wherein the procedure asking for service with respective EESes of the plurality of EESes comprises an EAS discovery procedure.

11. The methods, apparatuses, and articles of any of clauses 1-10, further providing for obtaining, by the EEC, offer responses from the respective EESes including KPIs information for EASes served by the respective EESes.

12. The methods, apparatuses, and articles of any of clauses 1-11, further providing for selecting, by the EEC while the UE is using the edge computing service in correspondence with the S-EAS and S-EES, a T-EES and a T-EAS for relocation of the application context in correspondence to the probing.

13. The methods, apparatuses, and articles of clause 12, wherein the EEC selects the T-EES for relocation of the application context in correspondence to the probing indicating that the T-EAS served by the T-EES is a best EAS of EASes served by the probed EESes.

14. The methods, apparatuses, and articles of clause 13, wherein the T-EAS is identified as the best EAS of the probed EASes in correspondence to comparison of KPIs information obtained by the probing indicating that the T-EAS has best KPIs of probed EASes.

15. The methods, apparatuses, and articles of any of clauses 12-13, wherein the T-EES and the T-EAS are selected for relocation of the application context in correspondence to the probing indicating that the T-EES serving the T-EAS has a lowest RTT of probed EESes.

16. The methods, apparatuses, and articles of any of clauses 1-15, wherein the application context relocation request is configured to initiate an application context relocation procedure to be performed by the S-EES.

17. The methods, apparatuses, and articles of any of clauses 1-16, further providing for receiving, by the EEC from the S-EES, information regarding completion of application context relocation.

18. The methods, apparatuses, and articles of any of clauses 1-17, further providing for performing, by the EEC with a T-EES for the application context relocation request, a registration process or an application context relocation complete notification process establishing an association in which the EEC is served by the T-EES and using a T-EAS associated with the T-EES.

19. Methods, apparatuses, and articles for wireless communication may provide for storing, by a UE, EES information for a plurality of EESes of an ECA available in a PLMN; probing, by an EEC of the UE while the UE is using an edge computing service in correspondence with a S-EAS and S-EES, one or more EESes of the plurality of EESes in correspondence to the EES information to identify an EAS other than the S-EAS for use with respect to the edge computing service; and providing, by the EEC of the UE to a T-EES, an application context relocation request including EAS information for relocation of the application context in correspondence to the probing identifying the EAS other than the S-EAS for use with respect to the edge computing service.

20. The methods, apparatuses, and articles of clause 19, wherein the EAS information is configured to enable the T-EES to identify application context information for relocating the application context from the S-EAS in use by the EEC to a T-EAS associated with the T-EES.

21. The methods, apparatuses, and articles of any of clauses 19-20, further providing for performing, by the EEC, a general service provisioning procedure prior to runtime of edge computing applications, wherein the EES information for the plurality of EESes is stored for use in triggering the application context relocation request as part of the general service provisioning procedure.

22. The methods, apparatuses, and articles of clause 21, wherein the general service provisioning procedure is performed at a time of UE power-up, or upon the UE joining the PLMN.

23. The methods, apparatuses, and articles of any of clauses 19-22, further providing for obtaining, by the EEC from one or more ECSes of the ECA, the EES information for the plurality of EESes, wherein the EES information includes information regarding one or more EESes in communication with a respective ECS that are associated with an EAS suitable for providing one or more edge computing service with respect to the UE.

24. The methods, apparatuses, and articles of any of clauses 19-23, further providing for performing, by the EEC, an EAS discovery procedure at an initial edge computing application runtime; selecting, by the EEC, the S-EAS in association with the EAS discovery procedure; and using, by the UE, the edge computing service as provided by the S-EAS.

25. The methods, apparatuses, and articles of any of clauses 19-24, further providing for determining, by the EEC while the UE is using the edge computing service in correspondence with the S-EAS and S-EES, to perform the probing of the one or more EESes of the plurality of EESes.

26. The methods, apparatuses, and articles of clause 25, wherein the determining to perform probing of the one or more EESes of the plurality of EESes is performed in association with one or more of expiration of an in-service discovery timer, observation of a degraded indicator of KPIs with the S-EAS, detection of UE mobility, change of requirements by an application client of the UE using the edge computing service, or a request by the application client.

27. The methods, apparatuses, and articles of any of clauses 19-26, wherein the probing of the one or more EESes of the plurality of EESes is performed as part of a procedure asking for service with respective EESes of the plurality of EESes.

28. The methods, apparatuses, and articles of clause 27, wherein the procedure asking for service with respective EESes of the plurality of EESes comprises an EAS discovery procedure.

29. The methods, apparatuses, and articles of any of clauses 19-28, further providing for obtaining, by the EEC, offer responses from the respective EESes including KPIs information for EASes served by the respective EESes.

30. The methods, apparatuses, and articles of any of clauses 19-29, further comprising:

selecting, by the EEC while the UE is using the edge computing service in correspondence with the S-EAS and S-EES, the T-EES and a target EAS (T-EAS) for relocation of the application context in correspondence to the probing.

31. The methods, apparatuses, and articles of clause 30, wherein the EEC selects the T-EES for relocation of the application context in correspondence to the probing indicating that the T-EAS served by the T-EES is a best EAS of EASes served by the probed EESes.

32. The methods, apparatuses, and articles of clause 31, wherein the T-EAS is identified as the best EAS of the probed EASes corresponding to comparison of KPIs information obtained by the probing indicating that the T-EAS has best KPIs of probed EASes.

33. The methods, apparatuses, and articles of any of clauses 30-31, wherein the T-EES and the T-EAS are selected for relocation of the application context in correspondence to the probing indicating that the T-EES serving the T-EAS has a lowest RTT of probed EESes.

34. The methods, apparatuses, and articles of any of clauses 19-33, wherein the application context relocation request is configured to initiate an application context relocation procedure to be performed by the T-EES.

35. The methods, apparatuses, and articles of any of clauses 19-34, further comprising:

receiving, by the EEC from the T-EES, information regarding completion of application context relocation.

36. The methods, apparatuses, and articles of any of clauses 19-35, further providing for performing, by the EEC with the T-EES, a registration process or an application context relocation complete notification process establishing an association in which the EEC is served by the T-EES and using a T-EAS associated with the T-EES.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to S-EES centric and/or T-EES centric UE triggered application context relocation procedures may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 5-8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    storing, by a user equipment (UE), edge enabler server (EES) information for a plurality of EESes of an edge computing architecture (ECA) available in a public land mobile network (PLMN);
    probing, by an edge enabler client (EEC) of the UE while the UE is using an edge computing service in correspondence with a source edge application server (S-EAS) and source EES (S-EES), one or more EESes of the plurality of EESes in correspondence to the EES information to identify an EAS other than the S-EAS for use with respect to the edge computing service, wherein the probing initiates a procedure configured to invoke a response from the one or more EESes of the plurality of EESes; and
    providing, by the EEC of the UE to the S-EES, an application context relocation request including EAS information for relocation of an application context associated with the edge computing service in correspondence to the probing identifying the EAS other than the S-EAS for use with respect to the edge computing service.

2. The method of claim 1, wherein the EAS information is configured to enable the S-EES to identify application context information for relocating the application context from the S-EAS in use by the EEC to a target EAS (T-EAS) associated with a target EES (T-EES) for the application context relocation request.

3. The method of claim 1, further comprising:
    performing, by the EEC, a general service provisioning procedure prior to runtime of edge computing applications, wherein the EES information for the plurality of EESes is stored for use in triggering the application context relocation request as part of the general service provisioning procedure.

4. The method of claim 1, further comprising:
    determining, by the EEC while the UE is using the edge computing service in correspondence with the S-EAS and S-EES, to perform the probing of the one or more EESes of the plurality of EESes, wherein the determining to perform probing of the one or more EESes of the plurality of EESes is performed in association with one or more of expiration of an in-service discovery timer or change of requirements by an application client of the UE using the edge computing service.

5. The method of claim 1, wherein the procedure configured to invoke the response from the one or more EESes of the plurality of EESes invoked by the probing of the one or more EESes of the plurality of EESes comprises an EAS discovery procedure asking for service with respective EESes of the plurality of EESes.

6. The method of claim 1, further comprising:
    selecting, by the EEC while the UE is using the edge computing service in correspondence with the S-EAS and S-EES, a target EES (T-EES) and a target EAS (T-EAS) for relocation of the application context in correspondence to the probing, wherein the T-EES is selected for relocation of the application context in correspondence to comparison of key performance indicators (KPIs) information obtained by the probing indicating that the T-EAS served by the T-EES has best KPIs of probed EASes or the T-EES and the T-EAS are selected for relocation of the application context in correspondence to the probing indicating that the T-EES serving the T-EAS has a lowest round trip time (RTT) of probed EESes.

7. The method of claim 1, further comprising:
    receiving, by the EEC from the S-EES, information regarding completion of application context relocation.

8. The method of claim 7, further comprising:
    performing, by the EEC with a target EES (T-EES) for the application context relocation request, a registration process or an application context relocation complete notification process establishing an association in which the EEC is served by the T-EES and using a target EAS (T-EAS) associated with the T-EES.

9. An apparatus configured for wireless communication, the apparatus comprising:
- at least one processor; and
- a memory coupled to the at least one processor, wherein the at least one processor is configured to:
  - store, by a user equipment (UE), edge enabler server (EES) information for a plurality of EESes of an edge computing architecture (ECA) available in a public land mobile network (PLMN);
  - probe, by an edge enabler client (EEC) of the UE while the UE is using an edge computing service in correspondence with a source edge application server (S-EAS) and source EES (S-EES), one or more EESes of the plurality of EESes in correspondence to the EES information to identify an EAS other than the S-EAS for use with respect to the edge computing service, wherein the probe initiates a procedure configured to invoke a response from the one or more EESes of the plurality of EESes; and
  - provide, by the EEC of the UE to the S-EES, an application context relocation request including EAS information for relocation of an application context associated with the edge computing service in correspondence to probing identifying the EAS other than the S-EAS for use with respect to the edge computing service.

10. The apparatus of claim 9, wherein the at least one processor is configured to:
- perform, by the EEC, a general service provisioning procedure prior to runtime of edge computing applications, wherein the EES information for the plurality of EESes is stored for use in triggering the application context relocation request as part of the general service provisioning procedure.

11. The apparatus of claim 9, wherein the at least one processor is configured to:
- determine, by the EEC while the UE is using the edge computing service in correspondence with the S-EAS and S-EES, to perform probing of the one or more EESes of the plurality of EESes, wherein determining to perform probing of the one or more EESes of the plurality of EESes is performed in association with one or more of expiration of an in-service discovery timer or change of requirements by an application client of the UE using the edge computing service.

12. The apparatus of claim 9, wherein the procedure configured to invoke the response from the one or more EESes of the plurality of EESes invoked by probing of the one or more EESes of the plurality of EESes comprises an EAS discovery procedure asking for service with respective EESes of the plurality of EESes.

13. The apparatus of claim 9, wherein the at least one processor is configured to:
- select, by the EEC while the UE is using the edge computing service in correspondence with the S-EAS and S-EES, a target EES (T-EES) and a target EAS (T-EAS) for relocation of the application context in correspondence to probing, wherein the T-EES is selected for relocation of the application context in correspondence to comparison of key performance indicators (KPIs) information obtained by the probing indicating that the T-EAS served by the T-EES has best KPIs of probed EASes or the T-EES and the T-EAS are selected for relocation of the application context in correspondence to the probing indicating that the T-EES serving the T-EAS has a lowest round trip time (RTT) of probed EESes.

14. The apparatus of claim 9, wherein the at least one processor is configured to:
- receive, by the EEC from the S-EES, information regarding completion of application context relocation.

15. The apparatus of claim 14, wherein the at least one processor is configured to:
- perform, by the EEC with a target EES (T-EES) for the application context relocation request, a registration process or an application context relocation complete notification process establishing an association in which the EEC is served by the T-EES and using a target EAS (T-EAS) associated with the T-EES.

16. A method of wireless communication, comprising:
- storing, by a user equipment (UE), edge enabler server (EES) information for a plurality of EESes of an edge computing architecture (ECA) available in a public land mobile network (PLMN);
- probing, by an edge enabler client (EEC) of the UE while the UE is using an edge computing service in correspondence with a source edge application server (S-EAS) and source EES (S-EES), one or more EESes of the plurality of EESes in correspondence to the EES information to identify an EAS other than the S-EAS for use with respect to the edge computing service, wherein the probing initiates a procedure configured to invoke a response from the one or more EESes of the plurality of EESes; and
- providing, by the EEC of the UE to a target EES (T-EES), an application context relocation request including EAS information for relocation of an application context associated with the edge computing service in correspondence to the probing identifying the EAS other than the S-EAS for use with respect to the edge computing service.

17. The method of claim 16, wherein the EAS information is configured to enable the T-EES to identify application context information for relocating the application context from the S-EAS in use by the EEC to a target EAS (T-EAS) associated with the T-EES.

18. The method of claim 16, further comprising:
- performing, by the EEC, a general service provisioning procedure prior to runtime of edge computing applications, wherein the EES information for the plurality of EESes is stored for use in triggering the application context relocation request as part of the general service provisioning procedure.

19. The method of claim 16, further comprising:
- determining, by the EEC while the UE is using the edge computing service in correspondence with the S-EAS and S-EES, to perform the probing of the one or more EESes of the plurality of EESes, wherein the determining to perform probing of the one or more EESes of the plurality of EESes is performed in association with one or more of expiration of an in-service discovery timer or change of requirements by an application client of the UE using the edge computing service.

20. The method of claim 16, wherein the procedure configured to invoke the response from the one or more EESes of the plurality of EESes invoked by the probing of the one or more EESes of the plurality of EESes comprises an EAS discovery procedure asking for service with respective EESes of the plurality of EESes.

21. The method of claim 16, further comprising:
- selecting, by the EEC while the UE is using the edge computing service in correspondence with the S-EAS and S-EES, the T-EES and a target EAS (T-EAS) for relocation of the application context in correspondence to the probing, wherein the T-EES is selected for relocation of the application context in correspondence to comparison of key performance indicators (KPIs) information obtained by the probing indicating that the T-EAS served by the T-EES has best KPIs of probed EASes or the T-EES and the T-EAS are selected for relocation of the application context in correspondence to the probing indicating that the T-EES serving the T-EAS has a lowest round trip time (RTT) of probed EESes.

22. The method of claim 16, further comprising:
receiving, by the EEC from the T-EES, information regarding completion of application context relocation.

23. The method of claim 22, further comprising:
performing, by the EEC with the T-EES, a registration process or an application context relocation complete notification process establishing an association in which the EEC is served by the T-EES and using a target EAS (T-EAS) associated with the T-EES.

24. An apparatus configured for wireless communication, the apparatus comprising:
at least one processor; and
a memory coupled to the at least one processor, wherein the at least one processor is configured to:
store, by a user equipment (UE), edge enabler server (EES) information for a plurality of EESes of an edge computing architecture (ECA) available in a public land mobile network (PLMN);
probe, by an edge enabler client (EEC) of the UE while the UE is using an edge computing service in correspondence with a source edge application server (S-EAS) and source EES (S-EES), one or more EESes of the plurality of EESes in correspondence to the EES information to identify an EAS other than the S-EAS for use with respect to the edge computing service, wherein the probe initiates a procedure configured to invoke a response from the one or more EESes of the plurality of EESes; and
provide, by the EEC of the UE to a target EES (T-EES), an application context relocation request including EAS information for relocation of an application context associated with the edge computing service in correspondence to probing identifying the EAS other than the S-EAS for use with respect to the edge computing service.

25. The apparatus of claim 24, wherein the at least one processor is configured to:
perform, by the EEC, a general service provisioning procedure prior to runtime of edge computing applications, wherein the EES information for the plurality of EESes is stored for use in triggering the application context relocation request as part of the general service provisioning procedure.

26. The apparatus of claim 24, wherein the at least one processor is configured to:
determine, by the EEC while the UE is using the edge computing service in correspondence with the S-EAS and S-EES, to perform probing of the one or more EESes of the plurality of EESes, wherein determining to perform probing of the one or more EESes of the plurality of EESes is performed in association with one or more of expiration of an in-service discovery timer or change of requirements by an application client of the UE using the edge computing service.

27. The apparatus of claim 24, wherein the procedure configured to invoke the response from the one or more EESes of the plurality of EESes invoked by probing of the one or more EESes of the plurality of EESes comprises an EAS discovery procedure asking for service with respective EESes of the plurality of EESes.

28. The apparatus of claim 24, wherein the at least one processor is configured to:
select, by the EEC while the UE is using the edge computing service in correspondence with the S-EAS and S-EES, the T-EES and a target EAS (T-EAS) for relocation of the application context in correspondence to probing, wherein the T-EES is selected for relocation of the application context in correspondence to comparison of key performance indicators (KPIs) information obtained by the probing indicating that the T-EAS served by the T-EES has best KPIs of probed EASes or the T-EES and the T-EAS are selected for relocation of the application context in correspondence to the probing indicating that the T-EES serving the T-EAS has a lowest round trip time (RTT) of probed EESes.

29. The apparatus of claim 24, wherein the at least one processor is configured to:
receive, by the EEC from the T-EES, information regarding completion of application context relocation.

30. The apparatus of claim 29, wherein the at least one processor is configured to:
perform, by the EEC with the T-EES, a registration process or an application context relocation complete notification process establishing an association in which the EEC is served by the T-EES and using a target EAS (T-EAS) associated with the T-EES.

* * * * *